United States Patent
Muniz Herrera et al.

(10) Patent No.: US 11,901,743 B2
(45) Date of Patent: Feb. 13, 2024

(54) CASCADING COMMUNICATIONS FROM SENSING DEVICES TO A LINK

(71) Applicant: XEED, LLC, Boulder, CO (US)

(72) Inventors: Alfredo Muniz Herrera, Boulder, CO (US); Folasade Michelle Oba, Boulder, CO (US)

(73) Assignee: XEED, LLC, Boulder, CO (US)

( * ) Notice: Subject to any disclaimer, the term of this patent is extended or adjusted under 35 U.S.C. 154(b) by 0 days.

(21) Appl. No.: 18/189,155

(22) Filed: Mar. 23, 2023

(65) Prior Publication Data

US 2023/0341927 A1    Oct. 26, 2023

Related U.S. Application Data

(60) Provisional application No. 63/322,984, filed on Mar. 23, 2022.

(51) Int. Cl.
*G06F 3/01*      (2006.01)
*H04L 5/00*      (2006.01)
(Continued)

(52) U.S. Cl.
CPC .............. *H02J 50/40* (2016.02); *G01C 19/00* (2013.01); *G01P 15/18* (2013.01); *G06F 3/011* (2013.01);
(Continued)

(58) Field of Classification Search
CPC ..... H04L 67/12; H04L 1/1861; H04L 5/0055; H04W 84/18; H04W 4/38; H04W 56/001;
(Continued)

(56) References Cited

U.S. PATENT DOCUMENTS

2010/0164862 A1    7/2010   Sullivan et al.
2011/0214030 A1    9/2011   Greenberg et al.
(Continued)

FOREIGN PATENT DOCUMENTS

WO    2019010435 A1    1/2019
WO    2021194888 A1    9/2021

OTHER PUBLICATIONS

Axis; Retrieved Sep. 13, 2023 from: https://axisxr.gg/standard/.
(Continued)

*Primary Examiner* — Temesghen Ghebretinsae
*Assistant Examiner* — Ivelisse Martinez Quiles
(74) *Attorney, Agent, or Firm* — HOLZER PATEL DRENNAN

(57) ABSTRACT

Prior art systems can achieve full-body motion capture without external cameras; however, these systems are often expensive, limit the user's movements to a specified area, require the user to wear a specialized full-body suit, have a high device count, may be fully wired and/or require an energy-intensive WiFi connection. These systems also often require a thorough calibration procedure before each use and can lose their calibration when moving to different areas. The presently disclosed technology is directed to systems and methods for providing full-body motion capture in non-controlled environments where using multiple known camera perspectives is not possible or practical. Specifically, the presently disclosed technology utilizes cascading communications to connect an array of sensing devices to a common linking device to distinguish data packets from each of the sensing devices.

20 Claims, 11 Drawing Sheets

(51) Int. Cl.
    *H02J 50/40*      (2016.01)
    *H02J 50/10*      (2016.01)
    *H02J 50/70*      (2016.01)
    *H02J 50/00*      (2016.01)
    *H02J 50/90*      (2016.01)
    *H02J 7/00*      (2006.01)
    *G01C 19/00*      (2013.01)
    *G01P 15/18*      (2013.01)
    *G06T 13/40*      (2011.01)

(52) U.S. Cl.
    CPC ............ *G06T 13/40* (2013.01); *H02J 7/0044* (2013.01); *H02J 50/005* (2020.01); *H02J 50/10* (2016.02); *H02J 50/70* (2016.02); *H02J 50/90* (2016.02); *H04L 5/0055* (2013.01)

(58) Field of Classification Search
    CPC ... H04W 56/0015; H04W 12/33; H04W 4/80; H04W 4/027; G01P 15/18; G01C 19/00; G06T 13/40; G06F 3/011–017; G06F 1/163; A61B 2562/0219; A61B 5/1114; A61B 2562/0223; A63F 13/211; A63B 2220/836; G06V 40/23; A61H 2201/165; A61H 2201/5084; H02J 50/40; H02J 7/0044; H02J 50/005; H02J 50/10; H02J 50/70; H02J 50/90
    See application file for complete search history.

(56) References Cited

U.S. PATENT DOCUMENTS

| | | |
|---|---|---|
| 2015/0331138 A1 | 11/2015 | Estes et al. |
| 2016/0107309 A1 | 4/2016 | Walsh et al. |
| 2017/0003738 A1 | 1/2017 | Silkin et al. |
| 2017/0192496 A1 | 7/2017 | Balslev et al. |
| 2019/0097865 A1 | 3/2019 | Xu et al. |
| 2020/0145797 A1 | 5/2020 | Craig et al. |
| 2020/0259347 A1 | 8/2020 | Pereira et al. |
| 2020/0265628 A1 | 8/2020 | Chamdani et al. |
| 2020/0371584 A1* | 11/2020 | Zhao ................ G06F 3/011 |
| 2021/0044147 A9 | 2/2021 | Partovi et al. |
| 2021/0322853 A1 | 10/2021 | Lockhart et al. |
| 2021/0330247 A1 | 10/2021 | Larson et al. |
| 2022/0072374 A1 | 3/2022 | Douglas et al. |
| 2023/0003863 A1* | 1/2023 | Alves .................. H04W 4/029 |

OTHER PUBLICATIONS

Haritorax Wireless; Retrieved Sep. 13, 2023 from: https://en.shiftall.net/products/haritorax-w.

MVN Awing, Novella.com; Retrieved Sep. 13, 2023 from: https://www.movella.com/products/motion-capture/xsens-mvn-awinda#products.

SlimeVR Full-Body Tracker, Crowd Supply; Retrieved Sep. 8, 2023 from: https://www.crowdsupply.com/slimevr/slimevr-full-body-tracker.

Sony mocopi 3D Motion Capture System, QMSS1/USCX; Retrieved Sep. 13, 2023 from: https://electronics.sony.com/more/mocopi/all-mocopi/p/qmss1-uscx.

Tundra Tracker Bundle—Tundra Labs; Retrieved Sep. 8, 2023 from: https://tundra-labs.com/products/tundra-tracker-1.

VIVA Tracker (3.0), VIVE United States; Retrieved Sep. 8, 2023 from: https://www.vive.com/us/accessory/tracker3/.

* cited by examiner

400

Apply 5-15 trackers in a spaced arrangement across a user's body.
405

Calibrate the trackers against a fixed reference that includes one of the trackers.
410

Track accelerometer, magnetometer, and gyroscope measurements of each of the trackers as the user moves their body.
415

Generate signals that digitally represents orientation of of the trackers over time.
420

Consolidate signals output from the trackers at a singular link.
425

Interpolate data received by the link to generate a digital representation of the user's body movement.
430

FIG. 4

CASCADING COMMUNICATIONS FROM SENSING DEVICES TO A LINK

CROSS-REFERENCE TO RELATED APPLICATIONS

The present application claims benefit of priority to U.S. Provisional Patent Application No. 63/322,984 entitled "Full-Body Motion Capture in Non-Controlled Environments" and filed on Mar. 23, 2022, which is specifically incorporated by reference herein.

BACKGROUND

Full-body motion capture (also referred as motion capture, mo-cap, or mocap) references the process of recording movements of the human body and storing those movements digitally. It may be used in medical, film, video gaming, sports, military, and robotics applications, as examples. In medical applications, full-body motion capture may be used to track a patient's movements to diagnose and track treatment of a movement disorder (e.g., Parkinson's disease). In filmmaking and video game development, full-body motion capture is used to record the movements of a human actor and use that information to animate a digital representation of the human actor and their movements in 2-D or 3-D space. In sports, full-body motion capture is able to provide real-time feedback on various movements similar to training with a coach.

SUMMARY

Implementations described and claimed herein address the foregoing problems by providing a cascading communication system comprising: a first sensing device including: one or more sensors to generate and store data in a first buffer; a first microcontroller to pull a sample of the buffered data and place the sample into a first data packet sent outbound from the first sensing device at a time slot assigned to the first sensing device as referenced against a first sensing device clock signal; a second sensing device including: one or more sensors to generate and store data in a second buffer; a second microcontroller to pull a sample of the buffered data and place the sample into a second data packet sent outbound from the second sensing device at a time slot assigned to the second sensing device as referenced against a second sensing device clock signal; and a linking device connected to the first and second sensing devices, the linking device to: receive the first data packet from the first sensing device; acknowledge receipt of the first data packet with a first outbound confirmation packet including an instruction to modify timing of a next data packet to be sent outbound from the first sensing device to more closely match the time slot assigned to the first sensing device as referenced against a linking device clock signal; receive the second data packet from the second sensing device; and acknowledge receipt of the second data packet with a second outbound confirmation packet including an instruction to modify timing of a next data packet to be sent outbound from the second sensing device to more closely match the time slot assigned to the second sensing device as referenced against the linking device clock signal.

Other implementations are also described and recited herein.

BRIEF DESCRIPTION OF THE DRAWINGS

FIG. 4 illustrates example operations for using a full-body motion capture system according to the presently disclosed technology used in a non-controlled environment.

DETAILED DESCRIPTION

In a full-body motion capture session, movements of one or more users are recorded from multiple camera perspectives within a controlled environment and sampled many times per second to calculate positions and movements of the user(s) in 3D space. Typical modern motion capture systems often use infrared cameras that track infrared (IR) light-emitting diodes (LEDs) on subjects or objects of interest. While a controlled environment with multiple camera perspectives may be practical in filmmaking and video game development environments, such conditions may not exist for medical applications where a user is tracked at their home and other locations. In some cases, the user may be moving around in a large outdoor area where camera views may be out of range, obscured by weather or terrain, or occluded by other users in the field of view. Further, even when it is possible to provide a controlled environment with multiple camera perspectives, it may not be financially practical.

Other prior art systems may achieve full-body motion capture without external cameras; however, these systems are often expensive, limit the user's movements to a specified area, require the user to wear a specialized full-body suit, have a high device count, may be fully wired and/or require an energy-intensive WiFi connection. These systems also often require a thorough calibration procedure before each use and can lose their calibration when moving to different areas.

The presently disclosed technology is directed to systems and methods for providing full-body motion capture in non-controlled environments where using multiple known camera perspectives is not possible or practical. The solution presented is untethered and enables portable full-body motion capture in non-controlled environments without requiring the user to manually recalibrate.

Figure 1:
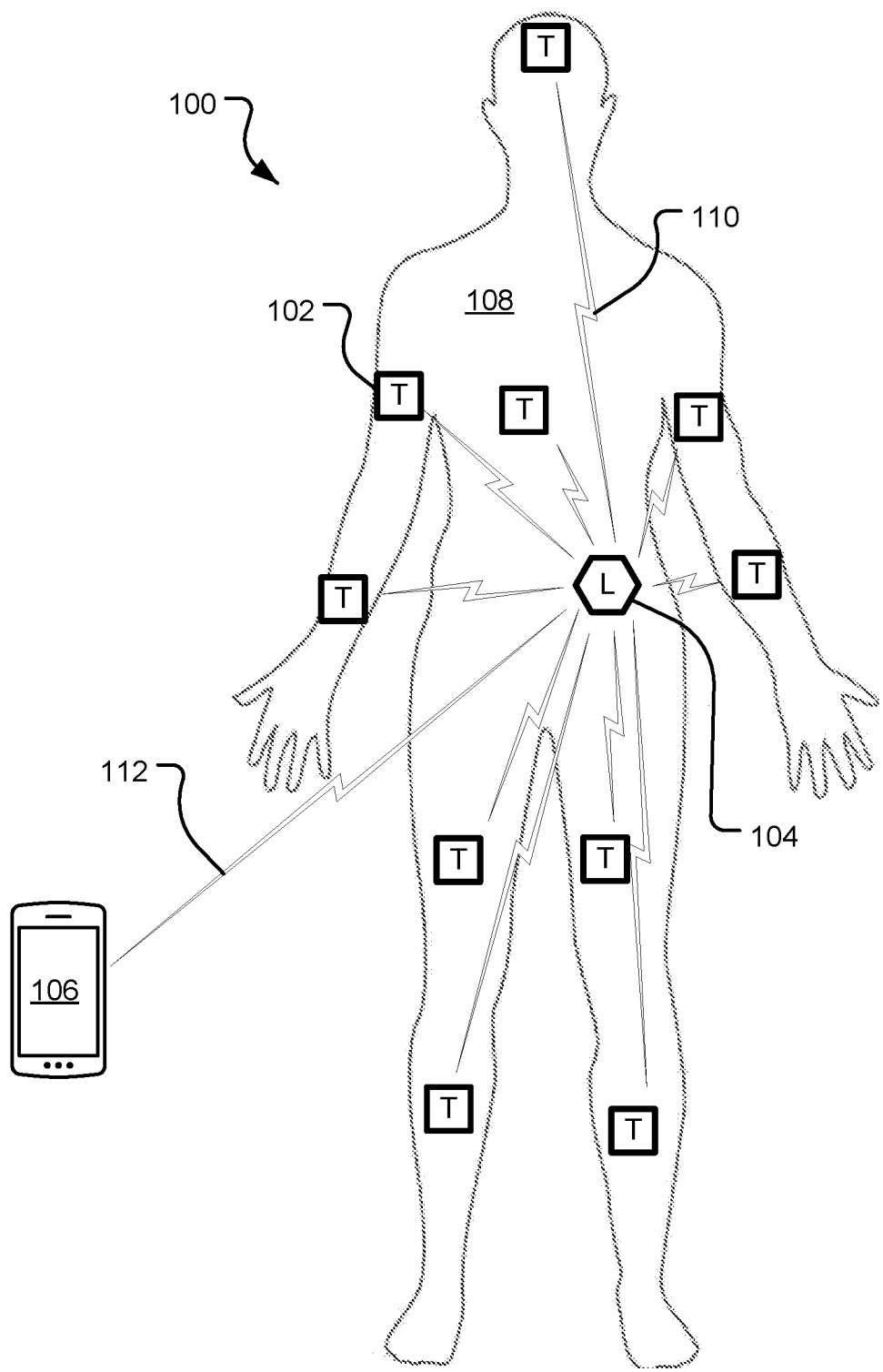
FIG. 1 illustrates a full-body motion capture system according to the presently disclosed technology used in a non-controlled environment.

FIG. 1 illustrates a full-body motion capture system 100 used in a non-controlled environment. Trackers (T) (e.g., tracker 102) represent measurement devices worn at disparate points on a user's body 108 to capture movements of the user's body. The trackers (T) may be strategically placed and spaced apart on the user's body 108 to capture relative motions of different portions of the user's body 108 (e.g., movement of the user's head, torso, arms, legs, relative to one another and overall movement of the user's body 108).

The trackers (T) each have a device housing that may be of a variety of sizes and shapes with a variety of internal components. In some implementations, the trackers (T) are each generally prismatic in shape, with a rounded top surface, and include at least a set of sensors, collectively and in combination with a computing device referred to herein as an inertial measurement unit (IMU), to determine orientation. For example, each of the trackers (T) may be equipped with an inertial sensor or accelerometer, a magnetometer, and a gyroscope. Outputs from the sensors, in combination with anatomical limitations imposed by the location of the user's body 108 upon which the trackers (T) are located, permit the system 100 to achieve full-body motion capture without the use of external cameras. The trackers (T) may also each be approximately 26 mm×26 mm×8 mm (+/−5 mm in all dimensions).

The trackers (T) may each be further equipped with a wireless transmitter utilising a short-range (low power) wireless communication protocol (e.g., Bluetooth, Zigbee, ShockBurst (SB), Enhanced ShockBurst (ESB), or a custom short-range communication protocol, etc.) operating over a variety of radio bands (e.g., 2.4 GHz ISM band) for communicating orientation of the trackers (T) to a link (L) 104. The link (L) 104 may also be placed on the user's body 108 and includes a wireless receiver. While the link (L) 104 can also be connected to a computer via USB, it does not need to be placed on the user's body 108 due to its wireless functionality. In other implementations, the link (L) 104 functionality can be combined with one or more of the trackers (T) or computing device 106 in a single device worn on the user's body 108. The link (L) 104 serves to receive and consolidate orientation data received from the trackers (T) via communication links (e.g., communication link 110, also referred to herein as a tracker orientation signal). In other implementations, the trackers (T) are each individually wired to the link (L) 104 in addition to or in lieu of wireless communication links.

The link (L) 104 may be equipped with a wireless transmitter utilising a short-range (low power) wireless communication protocol (e.g., Bluetooth, Zigbee, etc.) for communicating relative motion of the trackers (T) to the computing device 106 (e.g., a smartphone, smartwatch, tablet computer, laptop computer, desktop computer, and so on) via communication link 112, which may carry a singular body motion capture signal. In various implementations, the computing device 106 may be separate from the user's body 108 but nearby, as shown or worn on the user's body 108 similar to the link (L) 104 and the trackers (T). In other implementations, the link (L) 104 is wired to the computing device 106 in addition to or in lieu of a wireless communication link 112. In some implementations, devices other than the trackers (T) (e.g., haptic devices) may be connected to the link (L) 104 and become part of the system 100.

Alternatively, or additionally, the wireless transmitter may utilize a medium-range (medium power) wireless communication protocol (e.g., WIFI) for communicating relative motion of the trackers (T) to the computing device 106 that may be located further away (e.g., in the same room or building, but not within the user's reach). Alternatively, or additionally, the wireless transmitter may utilize a long-range (high power) wireless communication protocol (e.g., a cellular data network with access to the Internet) for communicating relative motion of the trackers (T) to the computing device 106 or cloud computing storage located anywhere within range of the long-range data network (e.g., geographically anywhere connected to the Internet).

In various implementations, the link (L) 104 includes the capability to receive signals from the trackers (T) using a first communication protocol and send signals to the computing device 106 using a second different communication protocol. Additionally, the link (L) 104 may have the capability to simultaneously stream to two different communication protocols. The link (L) 104 may further be capable of consolidating signals received from the trackers (T) into a singular outbound data stream to the computing device 106.

The trackers (T) and the link (L) 104 are intended to be lightweight, small, and unobtrusive to the user, and low-cost. As the trackers (T) only track orientation (not tracker position) using sensors that may be found in smartphones, the trackers (T) are lower-cost and consume less power than similar trackers that would also function to determine tracker position. Further, by utilizing a general-use computing device 106 that is already owned by the user (e.g., the user's smartphone), the full-body motion capture system 100 avoids an additional cost of a dedicated computing device. While the user is depicted in FIG. 1 as wearing 10 of the trackers (T), in other implementations, the user may wear 5-15 of the trackers (T) to various levels of full-body motion capture resolution.

Figure 2:
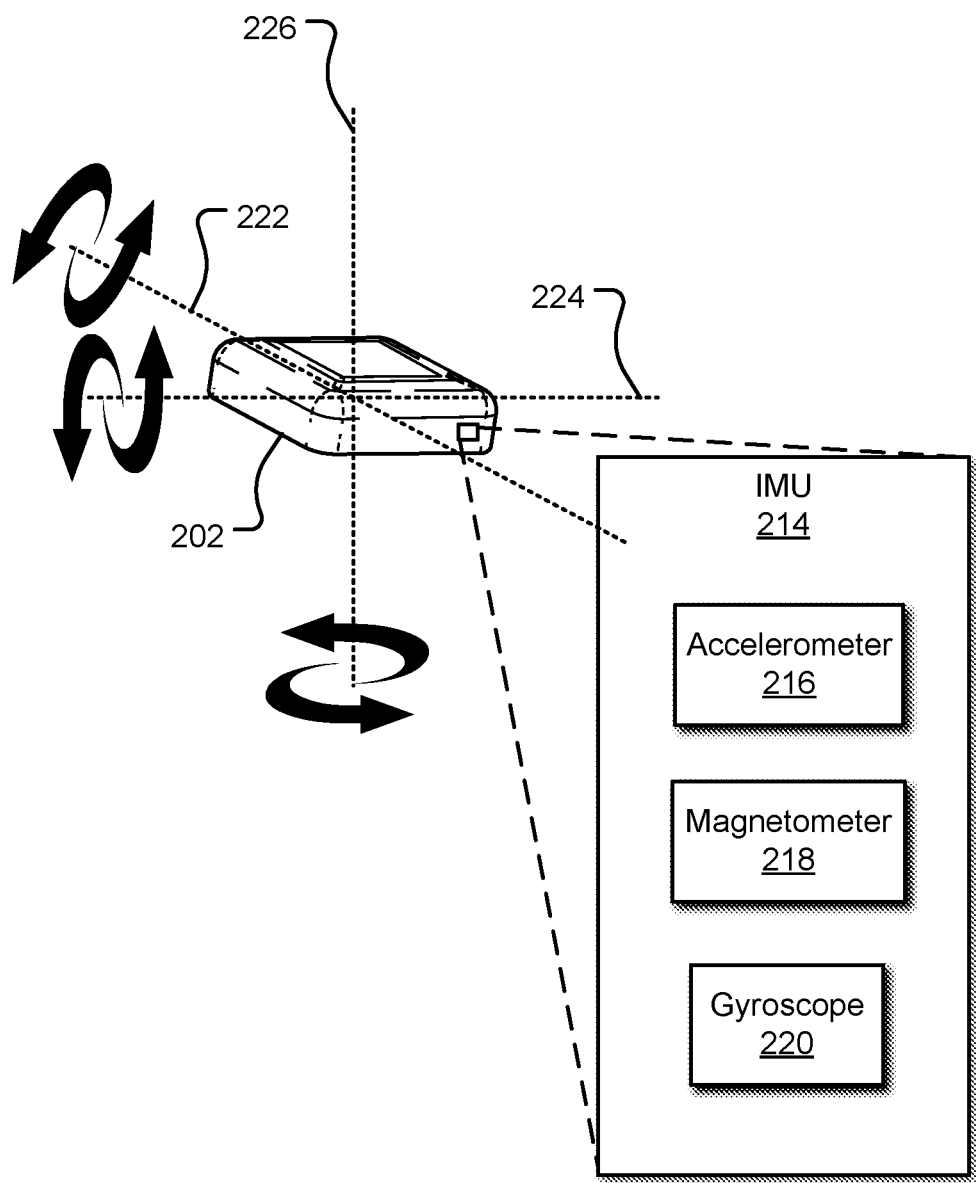
FIG. 2 illustrates an example tracker for a full-body motion capture system utilising a 3-sensor inertial measurement unit (IMU) to determine tracker orientation in a non-controlled environment.

FIG. 2 illustrates an example tracker 202 for a full-body motion capture system utilizing a 3-sensor inertial measurement unit (IMU) 214 to determine tracker orientation in a non-controlled environment. The tracker 202 is equipped with at least three sensors, collectively and in combination with a computing device referred to herein as the inertial measurement unit (IMU) 214, to determine relative movement. The IMU 214 includes an inertial sensor or accelerometer 216, a magnetometer 218, and a gyroscope 220. Outputs from the accelerometer 216, magnetometer 218, and gyroscope 220, in combination with anatomical limitations imposed by the location of a user's body upon which the tracker 202 is located, permit the tracker 202 in conjunction with other similar trackers (see e.g., trackers (T) of FIG. 1) to achieve full-body motion capture without the use of external cameras.

Overall orientation of the tracker 202 is defined by its rotation along three primary axes, pitch axis 222, roll axis 224, and yaw axis 226. Although roll, pitch, and yaw are discussed for simplicity of explanation, 4-dimensional quaternions may be used in actual implementation to avoid discontinuities. In an example implementation, the accelerometer 216 is primarily used for determining the tracker 202 orientation along two of the axes (e.g., along the pitch and roll axes 222, 224, but not the yaw axis 226) assuming no movement of the user's body. The magnetometer 218 is primarily used to determine orientation along the yaw axis 226. In combination, the accelerometer 216 and the magnetometer 218 are capable of fully determining the tracker 202 absolute orientation in space with respect to a local gravity vector and a local magnetic field vector. The gyroscope 220 is used to measure fast changes in the tracker 202 orientation, but the gyroscope 220 does not have a fixed reference and therefore will accumulate error over time.

Specifically, the accelerometer 216 is triaxial and measures acceleration on the tracker 202 using a 3-dimensional gravity vector as a fixed reference. When the tracker 202 is moving slowly or stationary (i.e., the only measurable acceleration is gravity), the accelerometer 216 accurately calculates pitch and roll angles about pitch and roll axes 222, 224, respectively. As even a human body in motion often and repeatedly comes to a stop, the IMU 214 is calibrated to identify points in time when the tracker 202 is substantially stationary by equating that condition with points in time where a magnitude of an acceleration vector output from the accelerometer 216 is within a tunable threshold at 9.8 m/s$^2$, or the assumed value of the magnitude of the gravity vector. At those points in time, the angles about pitch and roll axes 222, 224 are updated using the values output from the accelerometer 216 assuming the acceleration vector is oriented in the direction of gravity. These points in time are common in human movement and are present at sufficiently regular intervals that gyroscope drift does not accumulate in roll and pitch. While 9.8 m/s$^2$ is a commonly understood value for gravity on Earth, other gravity values may be used in a similar manner (e.g., in a micro-gravity environment, such as on the Moon). The accelerometer 216 measures force, so the foregoing technique can also be used in situations where the "gravity" vector is pointing in an arbitrary direction. Such arbitrary "gravity" vectors are useable so long as the force is constant and non-zero.

The 3-axis magnetometer 218 is primarily used to determine yaw angle about the yaw axis 226 by measuring magnetic field strength. Under most conditions, the magnetometer 218 measures the earth's magnetic north pole, which stays relatively constant. The magnetic field vector is addressed similarly to the foregoing gravity vector except it points in a different direction. The magnetic field vector depends on the geolocation and in most cases is orthogonal to the gravity vector making it usable for yaw angle calculations. Exceptions are found in the north and south poles, where the gravity and magnetic field vectors are aligned. In those limited cases, the accelerometer 216 and magnetometer 218 will measure the same values. In combination, the accelerometer 216 and the magnetometer 218 are capable of fully determining the tracker 202 orientation in space using roll, pitch, and yaw angles, however, the result is only accurate during slow movements (i.e., ignoring acceleration due to movement of the user. The gyroscope 220 is used to measure fast movements accurately but there is no fixed reference, which limits its usability to the short-term as errors will accumulate. The accelerometer 216 and the magnetometer 218 are thus used to correct the gyroscope 220 whenever they are determined to have high accuracy (e.g., during slow movements, and with a stable magnetic field). Using the gyroscope 220 to make high-rate orientation estimates (e.g., a rate of 1000 Hz), the accelerometer 216 and the magnetometer 218 can be run at a lower sample rate (e.g., a rate of 10-50 samples/second) to reduce overall power consumption of the tracker 202.

The gyroscope 220 is triaxial and can be used to estimate yaw angle when there are nearby magnetic fields that affect the magnetometer 218. The accelerometer 216/magnetometer 218 in combination can be used to correct for drift in gyroscope 220 angular measurements as the gyroscope 220 operates with no fixed reference and errors accumulate over time. As nearby magnetic fields, of both hard and soft varieties, change over time, the tracker 202 likewise compensates for these magnetic fields over time.

In an example implementation, the magnetometer 218 data can be modeled as follows:

$$mag'=Soft*(mag-Hard);$$

mag' is 1×3 corrected magnetometer data;

mag is 1×3 raw magnetometer data from the magnetometer 218;

Soft is a 3×3 matrix containing rotation, skew, and scale; and

Hard is a 1×3 matrix containing positional offset.

Although soft-iron and hard-iron interference are often used to describe these correction terms, they are technically incorrect. Soft-iron refers to materials that can easily become magnetized and demagnetized. Although this does occur on the printed circuit board level, the soft-iron matrix mostly corrects magnetic distorting materials that are within millimeters of the magnetometer 218, whether hard or soft. Similarly, a hard-iron offset vector can also include soft-iron distortions. Corrected magnetometer data may be defined by:

$$mag'=Near*(mag-Far).$$

An ideal magnetic field reading produces a sphere when the magnetometer 218 is rotated in all possible orientations, however, near and far magnetic distortions will alter the sphere in different ways. For example, if the field is far, the magnetometer 218 sees an offset in magnetometer reading because the field distortion is weak relative to the Earth's magnetic field. The magnetic field is far enough that the distortion will be felt evenly across the magnetometer 218 sensor axes. This offset is caused by a weakening or strengthening of the total magnetic field as the Earth's magnetic field lines curve around a ferrous material before being read by the magnetometer 218. This is commonly caused by steel beams in buildings but can also be observed by nearby permanent magnets. Instead of the magnetic field being centered about the origin (0,0,0), the magnetic field will be centered around the combined effect of the magnetic field distortions. Depending on the interactions, this can either increase or decrease the overall magnetic field magnitude in a localized area. These localizations occur gradually over meters suggesting application of a continuous calibration algorithm.

If the magnetic field distortion is nearby (e.g., within millimeters), the magnetic field line will curve around the material causing the magnetometer 218 to lose or gain sensitivity along the direction of the magnetic field lines resulting in bulges to the ideal sphere. The magnetic field is near enough that the distortion will be felt unevenly across the magnetometer 218 sensor axes. The resulting shape is commonly referred to as an ellipsoid, however, this is technically incorrect. When the distortion is near the magnetometer 218, the magnetic field lines form a shape that applies uneven distortion to all axes. For example, if a near-field distortion is along the x-axis, it will apply a strong distortion to the +x axis and a slightly lower distortion to the −x axis. The result resembles an ellipsoid, but an ellipsoid is symmetrical, which may not accurately reflect reality. A 3×3 near matrix may better reflect reality as it assumes no symmetry. Once the near-field correction matrix is obtained, it may not need to be recalculated again.

Near-field magnetic interference typically originates from nearby soft magnetic objects (e.g., capacitors on an associated printed circuit board (PCB), associated traces and vias, batteries, coils, etc.) and is assumed to be relatively constant in low-power systems. Rotation of the tracker 202 about all of axes 222, 224, 226 is expected to yield a sphere of data with a fixed center. Near-field magnetic interference distorts the sphere of data to be ellipsoidal. Some prior art solutions fit the ellipsoidal data to a sphere fitting equation, which is generally insufficient to yield the desired accuracy at all angular orientations of the tracker 202 because the near-field distortion is not symmetric, as discussed above. In the presently disclosed technology, the dot product between the normalized gravitational direction as determined by the accelerometer 216 and normalized magnetic north as determined by the magnetometer 218 is assumed as constant and is known as the local magnetic inclination or dip angle. A sphere fitting equation using these additional constraints is then fit to the ellipsoid of yaw data to yield an improved near-field magnetic interference correction. An example near-field magnetic interference correction equation follows.

Solving for the near-field matrix involves calculating 12 variables in the following minimization problem:

Minimize: $ax'^{*}mx'+ay'^{*}my'+az'^{*}mz'-\sin(dip)$;

$ax'$, $ay'$, $az'$ are the normalized acceleration values when acceleration is within a threshold from gravity;
$mx'$, $my'$, $mz'$ are the normalized magnetometer values after applying the near and far corrections;
dip is the local dip angle;

$x = N11^{*}(mx-F0) + N12^{*}(my-F1) + N13^{*}(mz-F2)$;

$y = N21^{*}(mx-F0) + N22^{*}(my-F1) + N23^{*}(mz-F2)$;

$z = N31^{*}(mx-F0) + N32^{*}(my-F1) + N33^{*}(mz-F2)$;

norm = $\text{SQRT}(x^{2}+y^{2}+z^{2})$;

$mx' = x/\text{norm}$;

$my' = y/\text{norm}$;

$mz' = z/\text{norm}$;

N11 is the first row, column of the 3×3 Near-Field Correction Matrix;
F0 is the first element of the Far-Field Correction Vector; and
mx is the x-component of the raw magnetometer value from the sensor reading.

The foregoing is a multidimensional nonlinear equation with 12 unknowns solving for both the 3×3 Near-Field Correction Matrix (N) and the 1×3 Far-Field Correction Vector (F). The sensor data is noisy; therefore, an exact solution may not always exist when given only 12 data points. To reach a reasonable amount of accuracy, a linear least squares approach on a couple hundred properly spaced data points may be used to solve the overdetermined system. In this case, the selection of the points is important. They are representative of all possible rotations and are recorded in a magnetically stable environment. The Gauss-Newton algorithm can be used in this case as the Jacobian can be calculated analytically. Even though the Gauss-Newton results in multiple solutions depending on the starting point, the minima are all concentrated very close to the global minimum, therefore any solution may be acceptable and provide excellent accuracy. This algorithm is computationally intensive but only needs to be done once at the factory. The near-field correction matrix will always be valid in normal use even when changing locations.

What does change and is thus updated constantly is the 1×3 Far-Field correction vector. This vector can easily change depending on the environment but also depending on the sensor itself. Magnetometer 218 readings can change due to internal magnetization. To account for this, magnetometers with internal degaussing can be used to clear residual magnetization. The calibration itself is similar to the near-field correction minimization problem, except that the 3×3 near-field correction matrix is reused. As such, there are only 3 unknowns to solve for (F0, F1, F2). This algorithm operates in real-time, therefore the Gauss-Newton algorithm is no longer the fastest option as it only uses the Jacobian (first derivative) to update the estimate every iteration. A linear least squares algorithm that uses the Hessian (second derivative) may yield faster convergence in fewer iterations. Suitable algorithms include the Gradient Descent Algorithm and the Levenberg-Marquardt Algorithm, for example. The only requirement for the input data is to collect a suitable spread. Testing shows that 30 samples covering a 20-degree arc are suitable to achieve a 1% center offset error. Similar to before, the algorithms will return local minima depending on the starting point, but the solutions may all be concentrated near the real minimum making any solution acceptable.

These equations work because of an assumed physical property that the angle between the normalized magnetic field and the normalized acceleration is always equal to the local dip angle. However, this property is only true when the magnetic field is properly calibrated. Whenever there is an arbitrary acceleration vector, the magnetic field vector is separated by the local dip angle. When placed on a unit sphere, the possible magnetic field values form a circle with each point of the circle representing a different yaw angle. In sum, given an acceleration, yaw angle is indeterminate. However, when more points are collected, the possible true value of the magnetic field is narrowed because the magnetic field itself contains the true yaw angle. Essentially, the linear least squares algorithm finds the values that minimize the dot product thus finding the center of the sphere that results in the most accurate magnetometer 218 reading. Once the center of the sphere is found (the far field correction vector), the data can be centered and normalized. The acceleration can be used to rotate the magnetic field such that the x and y components form the tangent of the yaw angle, and the z-component equals the sin of the dip angle. The yaw angle obtained from the magnetic field can then be used to correct the gyroscope yaw angle.

Far field magnetic interference originates from nearby hard magnetic objects (e.g., speaker magnets) and can change rapidly as proximity to the source changes. Far-field magnetic interference shifts the center point for the sphere of data collected by rotation of the tracker 202, which is directly accounted for by checking the dot product between the normalized acceleration vector and the normalized magnetic field vector after applying near-field and far-field corrections. If the dot product matches the local dip angle within a threshold, then the yaw angle from the magnetic field can be trusted. If the dot product differs for more than a handful of samples, the far-field correction vector is recalculated by collecting more samples. Measurements in changes of angular yaw as measured by the gyroscope 220 are assumed to be accurate in the short term, but errors accumulate over time that make the gyroscope 220 progressively less accurate over time as it lacks a fixed point of reference. In contrast, yaw angle measurements output from the magnetometer 218 are potentially compromised by far-field magnetic interference, and thus may not be trusted when the dot product is not close to the dip angle. However, as the magnetometer 218 has a fixed magnetic-north point of reference, any changes in short-term far-field magnetic interference can be calibrated for and used to correct the gyroscope error in the yaw axis when the data becomes reliable again as the magnetic north reference does not change.

The far-field magnetic interference is thus compensated for by first comparing the dot product between the normalized magnetometer after corrections and the normalized accelerometer to the local dip angle, and then calculating the resulting yaw angle when the magnetic sphere center is found. Since this calibration only needs a fraction of the sphere and 30 samples, it can be run continuously. Whenever the dot product does not match the local dip angle, the gyroscope 220 is instead used to update the orientation while calibration data is being collected. After 30 samples, the tracker 202 will run the far-field calibration algorithm and check the resultant dot product. When the dot product matches the dip angle, the magnetometer 218 can again be trusted, thus the yaw angle is corrected to the magnetometer 218 reading. In some implementations, a smoothing algorithm is used to prevent a noticeable snap to an updated magnetometer 218 reading when moving from a series of gyroscope 220 readings.

In sum, the accelerometer 216 measurements of gravity (pitch and roll angles) can be assumed accurate when the magnitude of the accelerometer 216 output equals a commonly understood value for gravity within a threshold. The magnetometer 218 measurement of magnetic north (yaw angle) can be assumed accurate when the dot product between the normalized acceleration and the normalized magnetic field after corrections equals the local dip angle within a threshold. If the dot product differs from the local dip angle, the gyroscope 220 incremental measurements of change in yaw angle can be assumed to be accurate in the short term until confidence in the magnetometer 218 measurement of yaw angle can be re-established.

The tracker 202 orientation combined with known tracker 202 relative positioning on the user's body and known anatomical constraints of the user's body enables continuous motion tracking in non-controlled environments, as further discussed below.

Figure 3:
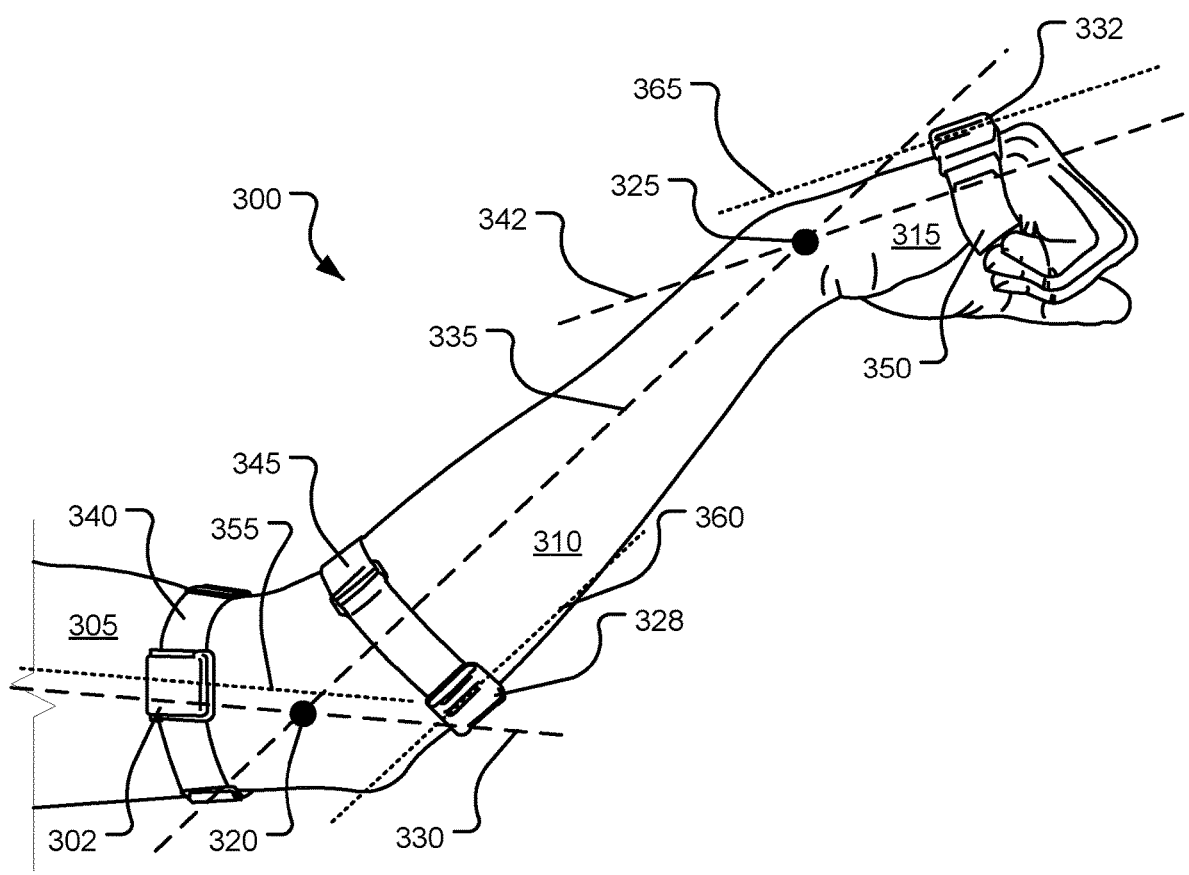
FIG. 3 illustrates a user's arm with trackers attached to determine limb position in a non-controlled environment.

FIG. 3 illustrates a user's arm 300 with trackers 302, 328, 332 attached to determine limb position in a non-controlled environment. While an arm is explicitly illustrated and described below, similar processes may be applied to a user's leg or other subset of or entire user's body to calculate position using tracker orientation data combined with known anatomical constraints of the user's body. The arm 300 may be analyzed as a kinematic chain including a set of links (i.e., upper arm 305, lower arm 310, and hand 315) and joints (i.e., elbow 320 and wrist 325). The links 305, 310, 315 are assumed as straight and rigid members, each extending along axes 330, 335, 342, respectively. The joint 320 is assumed as a hinge joint (one degree of freedom), while the joint 325 is assumed as a ball-and-socket joint (two rotational degrees of freedom). While the foregoing assumptions on possible motion of the upper arm 305, lower arm 310, and hand 315 links and the elbow 320 and wrist 325 joints are not absolute, for the purposes of calculating position using tracker orientation data, these are reasonably known anatomical constraints that can apply to all human bodies.

While the user's limbs can be calculated substantially the same way as described above with reference to the user's arm 300. The user's torso may be treated somewhat differently. In some implementations, the user's torso includes a singular tracker and is approximated by a rigid link. In further implementations, the user's torso includes two trackers, one on the user's upper torso and one on the user's lower torso. Using two trackers, movement of the user's torso can be approximated by two links connected by the ball-and-socket joint. Further additional trackers may be used on the user's torso (or interpolating the two torso trackers to estimate additional spine joints) may be used to more accurately represent an actual kinematic chain of the user's spine, depending on the accuracy required in rendering the movement of the user's torso. In implementations that do not reference an external absolute positioning device (e.g., a VR headset), one of the torso trackers may be used as a known position for basing position calculations of the other trackers therefrom.

The known anatomical constraints of the user's body are predefined and, in some implementations, include height, weight, and/or body type, and limb lengths/range of motion limitations of the user's limbs, for example. In other implementations, the known anatomical constraints are assumed as common to all users and not specific to any particular user's body. If the user wishes to animate a similar avatar, lengths of the user's limbs can be used to more accurately reflect their own dimensions, or they can animate an entirely different body model as their avatar. The user's height, weight, and/or body type may be used to show the user an avatar more similar to themselves, however, this is not necessary for the functionality of the full-body motion capture systems disclosed herein because orientation of the limbs do not change when limbs lengths are resized. Assumed anatomical constraints may be based on generally known anatomical models of the human body, including limits of human joint rotations, and are used to calculate tracker position using measured tracker orientation. Use of the term "body" herein without "human" refers to any human or non-human (e.g., animal) body, and even bodies that may not have a basis in the real world (e.g., a giant, alien, and hydra).

Similar anatomical models may be made for other non-humanoid animals, such as canines or felines. In such cases, a humanoid user's movements may be mapped to a non-humanoid avatar. Further, a non-humanoid user, such as a dog, may be mapped to a humanoid or non-humanoid avatar. Still further, the presently disclosed technology may be applied to any inanimate object that can be approximated by a kinematic chain, or a combination of such an inanimate object with a humanoid kinematic chain (e.g., a user holding sporting equipment, such as a fishing rod, that can be approximated using a kinematic chain).

The trackers 302, 328, 332 are each attached to the user's upper arm 305, lower arm 310, and hand 315, respectively. The trackers 302, 328, 332 each include bands 340, 345, 350, respectively, each of which serves to attach the trackers 302, 328, 332 to the arm 300. The bands 340, 345, 350 further serve to orient roll axes 355, 360, 365 of the trackers 302, 328, 332, to run substantially parallel to the user's upper arm 305, lower arm 310, and hand 315, respectively, as illustrated. The bands 340, 345, 350 prevent the trackers 302, 328, 332 from being mounted to the links 305, 310, 315 in a non-aligned fashion, thus allowing the alignment to become part of the constraints for calculating tracker position using tracker orientation data and the assumed anatomical constraints.

In some implementations, each of the trackers 302, 328, 332 may optionally be mounted in reverse positions from that shown. However, this still yields roll axes 355, 360, 365 of the trackers 302, 328, 332, running substantially parallel to the user's upper arm 305, lower arm 310, and hand 315, respectively. Only the direction of the trackers 302, 328, 332 is reversed, which can be compensated for by resetting the zero point of the trackers 302, 328, 332 using a calibration process, as discussed in further detail below. In other implementations, the yaw or pitch axis of each of the trackers 302, 328, 332 runs substantially parallel to the user's upper arm 305, lower arm 310, and hand 315, respectively, instead of the roll axis. This assumption can be used as a known constraint for calculating tracker position using tracker orientation data and the assumed anatomical constraints.

As noted above, assumed anatomical constraints for the human body based on known body mechanics and limits of its movement are combined with tracker orientation data to generate tracker position over time. This data can be used to animate a digital avatar using the user's body movements in an uncontrolled environment (e.g., without cameras or other external tracker positioning information). In a calibration sequence that may include a limb identification sequence, trackers are pre-identified for use in specific positions on the user's body, which may include both the tracker orientation on the strap as well as the strap orientation on the body to properly align the axes. Once the limb identification sequence is complete, the calibration sequence continues with the user assuming a fixed starting position (e.g., a T-pose or an I-pose), where each of the trackers is reset based on the known fixed starting position. Calibration may be repeated periodically to address any drift issues by returning to the fixed starting position for a brief period of time (e.g., 1-3 seconds), with or without positively indicating that the user is re-calibrating.

The trackers 302, 328, 332 and an associated link (not shown, see e.g., link 104 of FIG. 1) may not be alone capable of determining absolute position within a physical space, such as a room. In various implementations, this is not an issue because the user's absolute position within the physical space is not relevant for animating the user's avatar. The user's avatar moves within a virtual space anyway and the user's real physical space is not needed. In other implementations, the absolute position within the physical space is important. In these cases, an external absolute positioning device (e.g., a VR headset) may be used to provide a reference point within the user's physical space to determine absolute position of the trackers 302, 328, 332 within the user's physical space.

The tracker positions are inferred using reverse-forward kinematics or RFK, which is based on forward kinematics (FK). Specifically, RFK starts with an endpoint position and orientation of a kinematic chain and works backward to calculate tracker positions down the kinematic chain using known joint orientations and link lengths. As compared to FK, which uses a starting position and rotation and link lengths to solve for tracker position forward down a kinematic chain, RFK starts with an endpoint position and rotation, and solves backward down the kinematic chain for tracker position.

Mathematically, FK propagates a system's internal known position forward in the kinematic chain and then aligns it to a target coordinate system at the end, as follows:

$$EL\_P = SH\_P + H(EL\_Q, SH2EL);$$

$$HA\_P = EL\_P + H(HA\_Q, EL2HA);$$

$$(T\_P - HA\_P) = \text{offset};$$

$$HA\_P \mathrel{+}= \text{offset}; \text{ and}$$

$$EL\_P \mathrel{+}= \text{offset}.$$

In contrast, RFK propagates the target coordinate system's known position backward in the kinematic chain in one iteration, as follows:

$$HA\_P = T\_P;$$

$$EL\_P = HA\_P - H(HA\_Q, HA2EL); \text{ and}$$

$$SH\_P = EL\_P - H(EL\_Q, EL2SH).$$

The offset is not needed because the calculations all occur within the target's coordinate system by propagating the position backward. Referencing the foregoing;

T_P is the target coordinate system's known position shared with the hand;

SH_P, EL_P, and HA_P are the shoulder, elbow, and hand positions;

EL_Q and HA_Q are the elbow and hand quaternion;

H( ) is the Hamilton product that rotates the link length by the quaternion; and SH2EL is the fixed shoulder to elbow length. Other lengths follow the same convention.

RFK calculates the unknown positions and aligns them to a known coordinate system in one iteration. When FK is used, one iteration is used for calculating the positions in an internal coordinate system and then another iteration is used for aligning the internal coordinate system to a known coordinate system by calculating the position difference between the two systems at the common joint. RFK can be especially useful in VR applications where a headset provides a position. The body tracking system can align to the VR coordinate system in one iteration by propagating the known position back into the kinematic chain.

Most body tracking systems use inverse kinematics (IK), which uses a single end-effector position and orientation to estimate missing joint positions and orientations along a kinematic chain. For example, a VR controller contains IR LEDs that are continuously read by a VR headset. The headset uses the magnitude and visible pattern of the constellation of LEDs to determine the location and orientation of the controller. If the controller is held in the user's hand, IK can be used to estimate the elbow position and orientation without having to have a separate tracker on the elbow. However, the accuracy of this estimate varies wildly and may not be suitable for applications that demand high-resolution data. Additionally, IK is traditionally used by animators because it is easier for an animator to control a hand and simply let the program figure out where the elbow should go. Higher accuracy is achieved with RFK as it produces one solution for a given set of inputs whereas IK produces several solutions. RFK is also computationally efficient and can be calculated every sample with only a single iteration whereas IK requires multiple samples and multiple iterations to converge on a solution when an analytic solution does not exist, as is the case for the human body.

In various implementations, hard limits in the anatomical constraints can be used to correct sensor errors or drift. For example, a hinge joint prevents motion outside of a singular plane. Trackers on either side of a hinge joint may be prevented from outputting position changes that are outside of that singular plane. Further, sensor readings outside of a hard limit may be averaged or adjusted gradually over time to reduce the likelihood of a noticeable correction. In some implementations, such corrections may indicate a need to re-calibrate the motion tracking system, per the procedure described above. In some implementations, the user may be notified of the need to recalibrate with an indicator (e.g., haptic feedback from the link). Further, in some implementations, customized hard limits are available for the user to set if they expect their avatar or a related tracked object to be limited in a specific manner (e.g., a tennis racket could have a hard limit that it remains attached to a specific user's hand).

FIG. 4 illustrates example operations 400 for using a full-body motion capture system according to the presently disclosed technology used in a non-controlled environment. In an applying operation 405, a user applies 5-15 trackers in a spaced arrangement across the user's body. The trackers each include an inertial sensor or accelerometer, a magnetometer, and a gyroscope, to determine tracker orientation. Further, each of the trackers is placed in predetermined locations on the user's body (e.g., the user's head, torso, and limbs). Although there are more areas on the user's body where the trackers can be placed, there are diminishing returns going beyond 15 total trackers. Example placement locations (counts) are head (1), chest (1), waist (1), upper arm (2), lower arm (2), hand (2), upper leg (2), lower leg (2), foot (2). Fingers and toes are also part of human body kinematic chains, but they can be considered special cases because their links and joints are not fully independent of each other, like other parts of the body, and thus require fewer trackers to fully capture their movements.

A calibration operation 410 calibrates the trackers against a fixed reference that includes one of the trackers. In an example implementation, the fixed reference is the user's head, which includes one of the trackers. The user stands in a predetermined position, and the trackers are calibrated against the fixed reference using known anatomical constraints of the user's body (e.g., the user's height and weight), as well as constraints in motion of the individual locations of the trackers (e.g., elbow and knees are limited to rotation about a single axis, while hip and shoulders are capable of rotation in all directions). In other implementations, no fixed reference is required for the calibration operation 410.

The calibration operation 410 may further define the exact location on the user's body where each of the trackers is applied. For example, while the user is instructed to apply one of the trackers to their left upper arm, the calibration operation 410 determines and stores the exact location of the tracker on the user's left upper arm (e.g., anterior, posterior, medial, or lateral). The calibration operation 410 defines a starting position and orientation of each of the trackers with reference to the fixed reference (e.g., a tracker applied to the user's head).

A tracking operation 415 tracks accelerometer, magnetometer, and gyroscope measurements of each of the trackers as the user moves from a first body position to a second body position, and so on. A sensor fusion operation 420 combines data from the accelerometer, magnetometer, and gyroscope associated with each tracker, to generate signals representing orientation for each tracker as the user changes their body position over time.

Sensor fusion is the process of taking data from separate sources and generating a combined output. In the case of IMU data, the inputs are accelerometer, gyroscope, and magnetometer data while the output is orientation data. Some filters conventionally used for IMU data include the Mahony, Kalman, and Madgwick algorithms. These algorithms all suffer from the same problem of not having a trusted reference for correction. They use the gravity vector and the magnetic field vector, but they assume the data is accurate under all conditions. If the input data is inaccurate, the filter takes that data and produces inaccurate results. In addition, these are general algorithms, not necessarily developed for the purposes of IMU sensor fusion. The disclosed method uses an opportunistic approach that relies on using data from sensors only when they are deemed accurate. In an example implementation, the gyroscope continuously collects data at over 400 Hz, which is sufficient to capture most human movement. The gyroscope data updates a quaternion by rotating it in the appropriate axes. The quaternion is converted to roll, pitch, and yaw angles in the XYZ Euler Angle Sequence for potential correction. The accelerometer data is sampled at 10 Hz and its magnitude is calculated. If the magnitude is close to gravity, then the data is assumed accurate.

Roll and Pitch are calculated from the accelerometer and compared against the quaternion-derived Roll and Pitch. A complementary filter is then used to combine the two measurements with more weight being placed on the quaternion-derived values to allow for smooth motions. Then the new roll, new pitch, and old yaw are combined to form the corrected quaternion. Correcting the yaw angle requires a combination of the concepts discussed. First, the trackers must know where on the body they are and their placement (e.g., trackers can be placed in two ways on the straps), which may be preconfigured.

After the trackers are defined to respective locations, the user stands in a calibration pose. The most natural appears to be the I-pose where the body is standing straight, feet are together facing forward, and the arms are extending straight down. The tracker detects that no motion has occurred for a predetermined time with the correct quaternion-derived acceleration values and determines that the user wants to calibrate. This can be done at any time. Since the trackers know where they are on the body, they know what quaternion they should reset to. An additional advantage is that if the pose is held by accident, the trackers' recalibration only improves the user experience.

In an alternative solution (that assumes a constant magnetic field) immediately after the quaternion reset, the tracker starts recording magnetometer data in a look-up-table (LUT) alongside yaw angles (that are assumed accurate short-term). The first thing to check is whether the magnetometer data can be trusted. In prior art approaches, this involves rotating the tracker in all possible orientations to find the ellipsoid of best fit but that is impractical for this application. Alternatively, an effective check is to compare magnetometer data to accelerometer data. Magnetometer data and accelerometer data both measure a fixed reference, they are simply different references, so the data is similar except rotated. The dot product of the two vectors gives the similarity between them. If they are similar, it means that the magnetometer data is accurate and is assumed accurate. New magnetometer data is only stored when the tracker has rotated a sufficient amount. If the magnetometer data is within a reasonable range of a value previously stored in the LUT, it will use that yaw angle and the quaternion derived yaw angle in a complementary filter to correct itself. In this way, the yaw angle will be accurate within a few degrees because the error is not allowed to grow. The magnetic field in a room is steady, so once a user calibrates in a room it will most likely be valid for all time. If a user changes rooms, the magnetic field is shifted slightly (e.g., due to different hard-iron offsets). Using the LUT and the quaternion-derived-yaw angle, the LUT can be offset so that the user may not need to recalibrate when changing rooms.

A consolidating operation 425 consolidates signals output from the trackers at a singular link. The link may also be attached to the user's body, or placed nearby, and serves to consolidate the signals output from the individual trackers. In various prior art systems, having multiple wireless trackers means having multiple links (also referred to as receivers), which increases link size because each antenna needs to be sufficiently spaced apart from the other antennas. Each link and tracker pair can operate at different frequencies to reduce interference, but interference will still be present if multiple link and tracker pairs are operating at the same time. The presently disclosed technology utilizes a singular link (or receiver) for all (or a subset) of the trackers. An additional benefit is the reduced load on a computation device since it only needs to manage data from one link as opposed to multiple links. Additionally, a single combined packet works well with standardized communication protocols such as Bluetooth or Wifi that are designed for larger packets and fewer concurrent connections.

In one implementation, the link utilizes cascading communications with the trackers to collect and distinguish the orientation data sent by the trackers to the link, as disclosed in further detail below with reference to FIGS. 5-7. In other implementations, the link scans predetermined wireless frequencies for a period of time sufficient to capture a signal. A tracker synchronizes its timer with the link so that it knows when to send its next packet of orientation data. The link switches to another frequency, waits for a signal, and synchronizes with another tracker. This is done until the expected number of trackers is reached and then repeats. With the clocks synchronized, the trackers are able to sleep when not sending data and the link is able to sleep when it does not expect to receive data, which keeps the battery requirements low, further aiding in a reduced tracker/link size. Further, the link acts as a data buffer and combines the data from the trackers into a single packet before sending it further down the data processing chain to another computing device. This keeps latency to a minimum as the processing required for real-time analysis is the sample rate of the data instead of a much faster on-demand sample rate.

An interpolation operation 430 interpolates the data received by the link to generate a digital representation of the user's body movement. More specifically, the interpolation operation 430 utilizes the tracker locations on the user's body and constraints specific to the user's body (or a generic human body), to generate a signal that digitally represents the relative location and movement of each tracker over time. The interpolation operation 430 is performed using each tracker on the user's body to fully map movement of the user's body to a digital avatar. In various implementations, the link is connected to a computing device that executes the interpolation operation 430. The digital representation of the user's body movement may then be stored within the computing device or sent on to other computing device(s) over a computing network.

Figure 5:
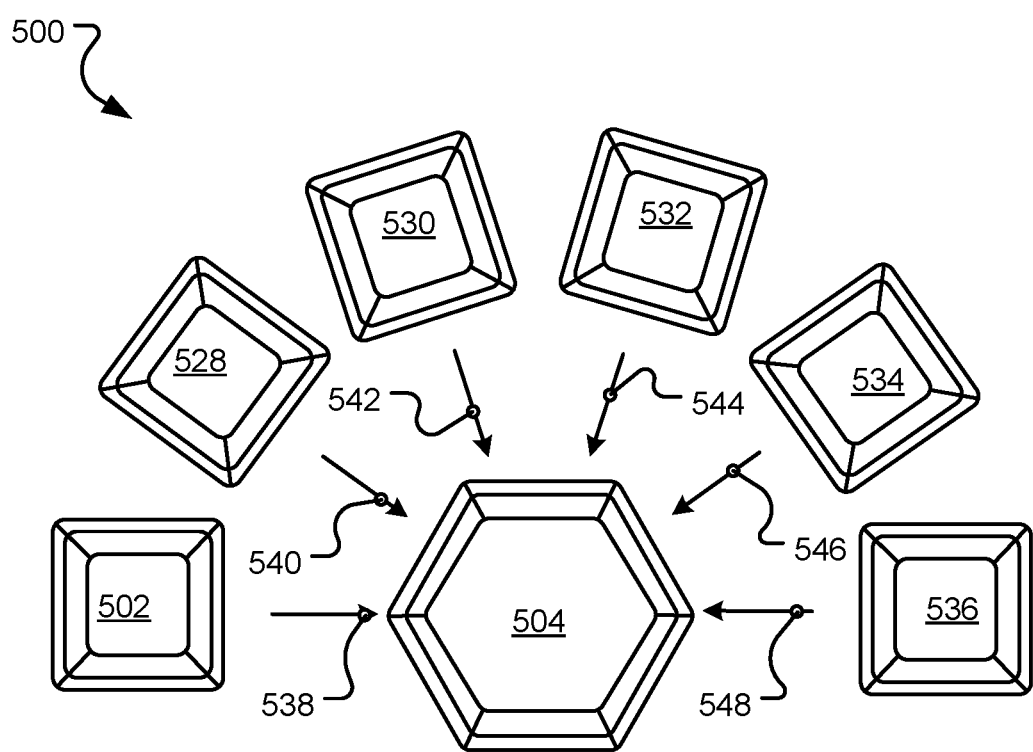
FIG. 5 illustrates a full-body motion capture system according to the presently disclosed technology with cascading communications between a link and its connected trackers.

FIG. 5 illustrates a full-body motion capture system 500 according to the presently disclosed technology with cascading communications between a link 504 and its connected trackers 502, 528, 530, 532, 534, 536. The trackers 502, 528, 530, 532, 534, 536 represent measurement devices worn on a user's body to capture movements of the user's body. The trackers 502, 528, 530, 532, 534, 536 may be strategically placed and spaced apart on the user's body to capture relative motions of different portions of the user's body.

The trackers 502, 528, 530, 532, 534, 536 are each equipped with a variety of sensors, collectively and in combination with a computing device referred to herein as an inertial measurement unit (IMU), to determine orientation. For example, each of the trackers 502, 528, 530, 532, 534, 536 may be equipped with an inertial sensor or accelerometer, a magnetometer, and a gyroscope. Outputs from the sensors, in combination with anatomical limitations imposed by the location of the user's body upon which the trackers 502, 528, 530, 532, 534, 536 are located, permit the system 500 to achieve full-body motion capture without the use of external cameras.

The trackers 502, 528, 530, 532, 534, 536 are each further equipped with a communication link with receive and transmit capability utilising a custom short-range communication protocol operating over a specific frequency (e.g., the 2.4 GHz ISM band) for communicating orientation of the trackers 502, 528, 530, 532, 534, 536 to the link 504. The link 504 is also placed on the user's body and also includes a communication link with receive and transmit capability. The link 504 serves to receive and consolidate the orientation data received from the trackers 502, 528, 530, 532, 534, 536 via the communication links.

Prior art body-worn trackers often operate with a 1:1 relationship with an associated link in an effort to maximize signal integrity and throughput. Such a system minimizes the risk that positional data from each of the trackers is confused with positional data from other trackers. However, such prior art systems substantially increase the number of links required from one, as provided in the presently disclosed technology, to a number equal to the number of trackers. This is disadvantageous due to cost and an increase in overall system complexity. Furthermore, these systems can still suffer from signal integrity issues because on-air collisions may be unavoidable when no synchronization scheme is employed.

Other prior art systems attempt to connect multiple trackers to a singular link via a common communication standard, such as Bluetooth. However, connecting multiple devices over a common communication standard such as Bluetooth tends to cause delays in packet receipt, including queued or dropped packets that must be re-requested from the trackers. Further, such prior art systems focus on sending positional data from the trackers to the links rather than orientation data, as provided herein. These positional data packets tend to be larger than orientation data packets, and thus more susceptible to packet loss due to wireless network bandwidth limitations.

A further problem with prior art body-worn sensors using wireless communication with one or more nearby links is that the human body tends to block most signals in the 2.4 GHz band. One solution is to use more power, but this comes at the price of a larger device. Instead, one can keep the range of the wireless connection short and increase the size of only one device, in this case the body-worn link 504. The link 504 can be worn on the user's body to minimize distance to the trackers 502, 528, 530, 532, 534, 536 and maximize connection quality.

To further improve connection quality, the trackers 502, 528, 530, 532, 534, 536 can space their signals to be received by the link 504 in time, space, or frequency. For example, the trackers 502, 528, 530, 532, 534, 536 may operate at frequencies spaced across the 2.4 GHz band, or across multiple frequency bands, to reduce on-air interference. For further example, the trackers 502, 528, 530, 532, 534, 536 may operate with predetermined time slots (e.g., an assigned point in time or timing window), each unique to one of the trackers 502, 528, 530, 532, 534, 536. More specifically, orientation data packets 538, 540, 542, 544, 546, 548 outbound from each of the trackers 502, 528, 530, 532, 534, 536, respectively, are cascaded in timing so that the link 504 receives the data packets in sequence. The link 504 is able to identify the source of each of the data packets based on when the data packet is received.

Figure 6:
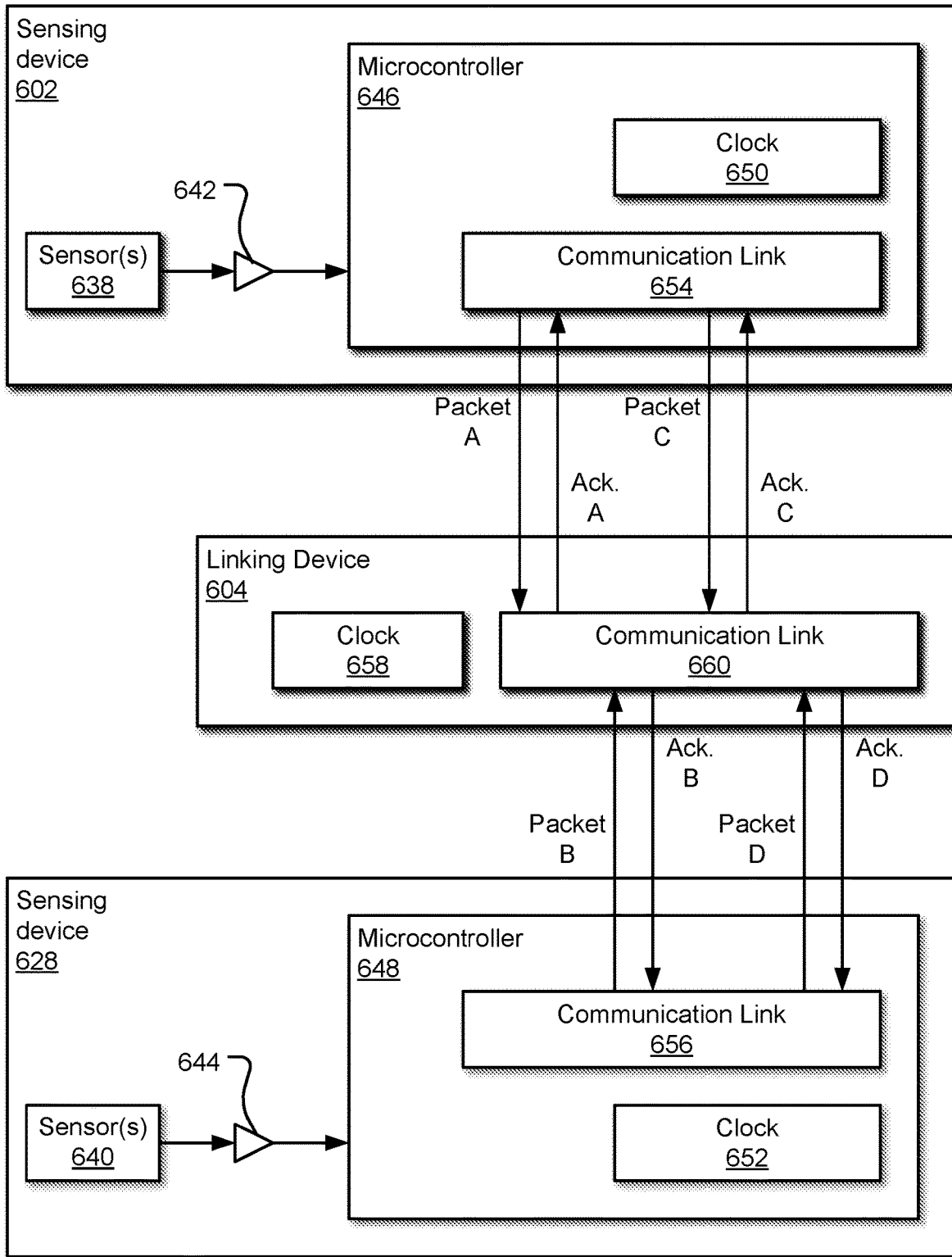
FIG. 6 illustrates a cascading communication system according to the presently disclosed technology with cascading communications between a linking device and its connected sensing devices.

The link 504 is further capable of providing feedback to the trackers 502, 528, 530, 532, 534, 536 in the form of confirmation packets (not shown, see e.g., Acknowledgement or confirmation packets A-D of FIG. 6) sent in response to receipt of each of the data packets 538, 540, 542, 544, 546, 548. The confirmation packets acknowledge receipt of each of the data packets 538, 540, 542, 544, 546, 548 and provide instruction to modify timing of the next data packet outbound from each of the trackers 502, 528, 530, 532, 534, 536 to more closely match the predetermined time slot assigned to the tracker. In this manner, the link 504 provides a continuous timing feedback loop that ensures the trackers 502, 528, 530, 532, 534, 536 continue to send orientation data packets at their assigned predetermined time slots.

Additionally, the data needed to transmit device orientation can be minimized to only a few bytes (e.g., less than 16 bytes or 8 bytes), which can be transmitted in under 1 ms, or even under 300 μs. While not in active use, the trackers 502, 528, 530, 532, 534, 536 can enter a low-power (sleep) mode while the IMU of each of the trackers 502, 528, 530, 532, 534, 536 fills up its data buffer. As discussed above, the trackers 502, 528, 530, 532, 534, 536 are synchronized with the link 504 such that two of the trackers 502, 528, 530, 532, 534, 536 are not sending orientation data packets at the same time to reduce interference and enable the trackers 502, 528, 530, 532, 534, 536 to sleep between sends for improved battery life. Use of a low power wireless connection and/or wire connection minimizes the power requirements of the trackers 502, 528, 530, 532, 534, 536, which allows them to be used to continuously monitor the user's body while the full-body motion capture system 500 is in use and still maintain long battery life. In a purely wired implementation, the trackers 502, 528, 530, 532, 534, 536 may omit dedicated battery power and draw power from a central battery located in the link 504.

While six trackers 502, 528, 530, 532, 534, 536 connected to one link 504 is illustrated in FIG. 5, other implementations may incorporate any number of trackers (e.g., 1 to 32) connected to a singular link, with the only limiting factor being the bandwidth available to separate the inbound data packets from each of the trackers in time. To elaborate, if it takes a tracker 1 ms to send a packet and receive a confirmation packet, then the radio time is 1 ms. In cascading communications, radio time cannot be occupied by more than one connection at the same time. Therefore, if the system 500 is running at 100 Hz (10 ms), the system 500 only supports 10 trackers. If the frequency is reduced to 30 Hz (33 ms), the system 500 increases support to 33 trackers. Radio time can be reduced by increasing the bitrate but at the cost of range and signal integrity. In some implementations, signal frequency is used to further separate groupings of trackers. For example, if more trackers than available bandwidth are used with a singular link, a first grouping of the trackers may utilize a first frequency band and a second grouping of the trackers may utilize a second frequency band, thereby doubling the maximum possible trackers that may be connected to a link. For further example, two separate full-body motion capture systems may be used in close proximity (e.g., within the same room or building) by operating a first link and its associated trackers over a first frequency band and a second link and its associated trackers over a second frequency band. Still further, more than two frequency bands may be utilized to still further expand the number of links and associated trackers that may be used in close physical proximity to one another.

In another implementation, one or more of the trackers 502, 528, 530, 532, 534, 536 may be replaced with a combined tracker (e.g., a glove) that includes multiple individual trackers. The orientation data of the multiple individual trackers is consolidated at the combined tracker, and the packets outbound from the combined tracker contain orientation data for each of the multiple individual trackers therein. In some implementations, this may yield incrementally larger orientation data packets. The system 500 can evenly space out and allocate the appropriate amount of time to accommodate various packet sizes by using a ratio of the total bandwidth. This works as long as the packet sizes are fixed and do not change over time. For example, if the combined tracking device uses 20% of the available bandwidth, then it will be given a larger timeslot that reflects that by shifting the other trackers that each only consumes 10% of the available bandwidth.

In various implementations, the outbound orientation data packets from the trackers 502, 528, 530, 532, 534, 536 are encrypted and/or authenticated. Encryption and/or authentication enhances user privacy and security while preventing or reducing non-authorized trackers from replacing the trackers 502, 528, 530, 532, 534, 536 or non-authorized links from replacing the link 504. The encryption process includes synchronized pseudo-random number generators present on both the trackers 502, 528, 530, 532, 534, 536 and the link 504. Each outbound orientation data packet iteration is generated with a new key based on the latest pseudo-random generated number, which will be known by both the tracker (for encryption) and the link (for decryption). Further, each pairing of tracker/link has its own pseudo-random number pairing, so that if any one of the trackers is hacked, only the one tracker is accessed. Authentication may be accomplished by both the tracker and the link generating a hash of each orientation data packet. If the hashes match, the orientation data packet is authenticated. The bit fields within each orientation data packet may also be scrambled to further enhance encryption and/or authentication of the orientation data packets.

New trackers may be added to the system 500 using a process by which the link 504 sends its position within the pseudo-random generator over to the new trackers so that the new tracker can synchronize to the same count. Going forward, the new tracker will then generate the same pseudo-random number-based keys as the link 504.

The result is low-footprint encrypted and/or authenticated orientation data packets. As the orientation data packets are already quite small, the low footprint encryption and/or authentication is important so as not to overburden the orientation data packets with security measures that overwhelm the quantity of data actually transmitted. A similar process for encrypting and/or authenticating data packets outbound from the link 504 to an external computing device (not shown, see e.g., external computing device(s) 1099 of FIG. 10) is also contemplated herein.

Information security addresses Confidentiality, Integrity, and Availability. Most readily available security systems are designed for larger data packets that generally contemplated herein or for storing data securely at rest. These algorithms are typically resource heavy and computationally expensive. Even technologies such as Bluetooth Low Energy that use AES-CCM as their default security require dedicated encryption/decryption hardware to run efficiently on systems with limited resources. Additionally, AES-CCM requires a minimum of 5-byte payload and an additional 4-bytes of data per packet for security, making it unusable in real-time applications with small payloads as the encryption overhead will be larger than the payload itself. As such, much of the prior art focuses on securing data at rest or securing larger packets. In fact, many real-time systems forgo any form of security due to a general belief that it is not possible to do it adequately in real-time.

The presently disclosed technology includes a symmetric key algorithm using stream ciphers following the concepts of a one-time pad (OTP). The resulting ciphertext is secure as long as:

1. The key is at least as long as the plaintext;
2. The key must be random;
3. The key must never be reused; and
4. The key must be kept secret.

Using these concepts as building blocks yields the presently disclosed algorithm.

A keysize of 64 bits (8 bytes) is chosen to match the payload of 64 bits. For a key to never be reused, a Counter Based Pseudo Random Number Generator (CBPRNG) can be used to generate a new 64-bit key every iteration. This type of number generator has no internal state and two separate CBPRNGs, which will produce the same result if they are given the same counter number if they use the same secret key. If they use different secret keys, then the resulting 64-bit key will not match. Since a CBPRNG is not truly random, it must be chosen carefully by ensuring it passes statistical tests for randomness, entropy, and uniformity. Additionally, this generator must be able to supply random numbers for at least as long as the life of the system 500 so as not to repeat. The secret key is programmed into each tracker-link pair at the factory and never shared again. This means that a specific tracker will only work with a specific link, such as link 504. Adding trackers or replacing trackers requires that the link 504 know the tracker's secret key. This secret key exchange can occur via a secure connection between the link 504 and a computing device.

The system 500 solves confidentiality issues by using the randomly generated key in various ways. The data can be XOR'd directly with the key. This will ensure that the data appears random to a passerby. However, even though the data may appear random, the passerby knows that certain data is being communicated. An attacker can intercept the packet and replace bits with their own data to guess the packet format. With this, they can determine which bits contain the orientation data or which bits contain the battery level since they can see that their changes are having an effect on those parts of the decrypted data. To prevent this, circular shifts can be used to increase confusion and diffusion such that the key moves the bits around. If an attacker tries the same technique, they now do not know which bits contain which data because the results will be random.

Integrity concerns itself with preventing the data from being tampered with as in the previous example. Integrity is achieved by using a cryptographic hash one-way function that produces the same result when fed the same data but a wildly different result when fed a slightly different data set. Usually, this is done with Message Authenticated Code (MAC). There are generally three ways to do this, but the quickest for small packets is the MAC-then-Encrypt (MtE). The payload is run through a hash function and a MAC is produced. The MAC is appended to the payload and then the key is used to XOR and bitshift the data to produce an encrypted packet. When the packet is transmitted, the receiver will first decrypt the packet using the same key and then run the resulting decrypted payload through the same hash function and compare the MAC. If they match then the data is safe to use, otherwise, the data has been tampered with and can be ignored. Quick hash functions such as the 32-bit versions of siphash or highwayhash can be used. The result can be XOR'd together and reduced to 8 bits to optimize packet size.

Availability concerns itself with preventing denial of service attacks which prevent legitimate users from using the system 500. For example, an attacker may send thousands of data packets per second resulting in the system 500 not receiving the actual real data, similar to a jammer. This problem may be unavoidable as the problem occurs at a physical level. Even if the system 500 changes frequencies randomly, the attacker may flood all the frequencies with the attack. The system 500 also has no way of detecting where the packet comes from without first decrypting the packet so the system 500 must spend the time to decrypt each packet before ignoring it. This is a problem with all wireless systems as the physical signal itself can be jammed which is equivalent to cutting the signal wire in a wired system.

Each of the trackers 502, 528, 530, 532, 534, 536 have a different secret key. That secret key is shared with the link 504. Initially, a tracker sends an unencrypted packet with no information and the link 504 replies with the current counter in an unencrypted confirmation packet. The link 504 must keep track of the counter to prevent reusing a counter or purposefully advancing the counter. The counter can be saved in persistent memory and can skip samples every time it reboots to prevent intentionally manipulating the counter value from draining the battery or glitching. Additionally, each of the trackers 502, 528, 530, 532, 534, 536 keeps track of its counter in the same way as an attacker can pretend to be either the link 504 or a tracker. If one of the trackers 502, 528, 530, 532, 534, 536 receives a link counter value that is lower than the current tracker counter value, that tracker will ignore the counter value and send another unencrypted zero data packet. The link 504 will advance the counter by a few thousand and try again. The link 504 will keep advancing the counter value until it is more than the tracker's current counter. While this can be done to intentionally forward the link counter, with $2^{64}$ possible values before an overflow, the process could take multiple lifetimes.

Once a tracker receives a valid counter value from the link 504, the tracker will run the CBPRNG and generate a 64-bit key. That key is used to run the hash function on the payload to generate an 8-bit MAC. The 56-bit payload and 8-bit MAC are then scrambled with the key to form the encrypted packet. The 64-bit encrypted packet is sent to the link 504. The link 504 receives the packet and runs the same CBPRNG using the same counter number and the same secret key as the tracker to generate the same 64-bit key. That key unscrambles the 64-bit encrypted packet and runs the 56-bit payload through the hash function. If the hash function produces the same 8-bit MAC that is present in the packet, then the data is safe to use. If the hashes do not match, then the data is ignored. In the next sample, the link counter and tracker counter are advanced regardless of whether the data was valid or not. If the hash is invalid after a set number of samples, the link 504 will revert to sending the counter number and the process starts over. In this way, communication between the link 504 and the tracker is secure. Even if an attacker manages to find the key to one of the trackers, it will only be valid for that one tracker.

FIG. 6 illustrates a cascading communication system (e.g., a full-body motion capture system) 600 according to the presently disclosed technology with cascading communications between a linking device (or link) 604 and its connected sensing devices (or trackers) 602, 628. While the sensing devices 602, 628 are generally discussed herein as representing measurement devices worn on a user's body to capture movements of the user's body, other implementations may include any sensor packages (or sensor(s), buffer, and microcontroller) capable of detecting information and queuing that information as data stored in a buffer for timed outbound transmission. Similarly, while the linking device 604 is generally discussed herein to receive and consolidate orientation data received from a set of trackers, the linking device 604 could merely receive data from the sensing devices 602, 628 and distinguish the received data based on its timing, with or without consolidating the received data.

The sensing devices 602, 628 and linking device 604 are each equipped with a low-frequency clock and a high-frequency clock (collectively clocks 650, 652, 658). The high-frequency clock is more accurate than the low-frequency clock but consumes more power. However, the high-frequency clock can calibrate the low-frequency clock periodically to maintain accuracy very similar to the high-frequency clock with less overall power consumption. Additionally, independent self-calibration of the low-frequency clocks synchronizes the tracker low-frequency clock for each of the sensing devices 602, 628 with the low-frequency clock for the linking device 604 to within a few nanoseconds without requiring the same clock source. The sensing devices 602, 628 use the low-frequency clock to wake up from sleep and perform functions such as reading the sensor data, performing sensor fusion, and sending data packets. These functions have a fixed code execution time.

Whenever the linking device 604 receives a data packet from one of the sensing devices 602, 628, it will compare the receive time against its own clock 658 and calculate the difference from the expected time. Assuming the packet arrives early or late, the linking device 604 sends the correction to the sensing device through a confirmation packet or acknowledgement (ack.). The sensing device receives the confirmation packet and adjusts its sleep time so that when it next wakes up, the linking device 604 will receive the packet closer to its expected time.

This process works due to the fixed code execution time. If the code has a variable execution time, the data processing can occur before going to sleep and the wakeup can be reserved for sending the packet since waking up and sending has a fixed execution time. The tracker does not attempt to resend packets if acknowledgements are not received but instead times out and simply goes to sleep. This is sufficient for body tracking data because data can be reasonably interpolated up to 6 missed samples. For applications that require higher data integrity, the sensing devices 602, 628 can keep track of the number of missed packets and offset the time since each missed packet uses a fixed amount of time. Although an algorithm is designed for systems with the frequency of the connected devices being the same, it is possible to modify the algorithm to handle devices with differing frequencies.

The sensing devices 602, 628 are each equipped with one or more sensors (e.g., IMUS) 638, 640, buffers 642, 644, and microcontrollers 646, 648, respectively. The microcontrollers 646, 648 are each further equipped with clocks 650, 652 and communication links 654, 656, each with receive and transmit capability utilising a custom short-range communication protocol operating over a specific frequency (e.g., the 2.4 GHz ISM band). The communication links 654, 656 communicate information collected by the sensor(s) 638, 640, and queued by the buffers 642, 644, respectively, to the linking device 604. The linking device 604 is equipped with its own clock 658 and communication link 660 that serves to receive, and in some implementations consolidate, the data received from the sensing devices 602, 628.

The sensing devices 602, 628 can space their signals to be received by the linking device 604 in time, space, or frequency. For example, the sensing devices 602, 628 may operate at frequencies spaced across the 2.4 GHz band, or across multiple frequency bands, to reduce on-air interference. For further example, the sensing devices 602, 628 may operate with predetermined time slots (e.g., an assigned point in time or timing window), each unique to one of the sensing devices 602, 628. Data packets outbound from the sensing devices 602, 628 may be cascaded in timing so that the linking device 604 receives the data packets in sequence. The linking device 604 can identify the source of each of the data packets based on when the data packet is received.

The linking device 604 is further capable of providing feedback to the sensing devices 602, 628 in the form of acknowledgement or confirmation packets sent in response to receipt of each of the data packets. The acknowledgement packets acknowledge receipt of each of the data packets and provide an instruction to modify timing of the next data packet outbound from each of the sensing devices 602, 628 to more closely match the predetermined time slot assigned to the sensing device. In this manner, the linking device 604 provides a continuous timing feedback loop that ensures the sensing devices 602, 628 continue to send data packets at their assigned predetermined time slots. Since the sensing devices 602, 628 have a fixed execution time and the low-frequency clocks are synchronized, the linking device 604 only needs to know what time the packet was received as the time difference from expected to actual receipt will be the exact offset needed on the sensing devices 602, 628 to ensure the next tracker packet will be closer to the expected receipt time.

The following specific example is provided for clarity. Clocks 650, 652, 658 operate on a cyclical cycle (e.g., 1000 Hz or 1 ms). Sensing device 602 is assigned time slot A (e.g., 0.4 milliseconds, 0.4 ms, 1.4 ms, 2.4 ms, and so on) referenced against a clock signal from clock 650. A sample of the buffered data (Packet A) is pulled from the buffer 642 and sent out via the communication link 654 at 0.4 ms. Upon receipt of the Packet A, the linking device 604 sends Acknowledgement A back to the sensing device 602 via the communication link 660 to confirm receipt of Packet A.

Receipt timing of the Packet A by the linking device 604 will be close enough to the assigned time slot A to identify the data packet as originating from the sensing device 602, but some error will be introduced by transit time, differences in operation of clocks 650, 652, 658, etc. Embedded within the Acknowledgement A is an instruction to modify timing of the next data packet to be sent outbound from the sensing device 602 to more closely match the time slot assigned to the sensing device 602 referenced against a clock signal from clock 658. This instruction is intended to correct any difference between the assigned time slot A and the actual received time for Packet A at the linking device 604.

Sensing device 628 is assigned time slot B (e.g., 0.8 milliseconds, 0.8 ms, 1.8 ms, 2.8 ms, and so on) referenced against a clock signal from clock 652. A sample of the buffered data (Packet B) is pulled from the buffer 644 and sent out via the communication link 656 at 0.8 ms. Upon receipt of the Packet B, the linking device 604 sends Acknowledgement B back to the sensing device 628 via the communication link 660 to confirm receipt of Packet B.

Receipt timing of the Packet B by the linking device 604 will also be close enough to the assigned time slot B to identify the data packet as originating from the sensing device 628, but some error will also be introduced by transit time, differences in operation of clocks 650, 652, 658, etc. Embedded within the Acknowledgement B is an instruction to modify timing of the next data packet to be sent outbound from the sensing device 628 to more closely match the time slot assigned to the sensing device 628. This instruction is intended to correct any difference between the assigned time slot B and the actual received time for Packet B at the linking device 604.

Another sample of the buffered data (Packet C) is pulled from the buffer 642 and sent out via the communication link 654 by default at 1.4 ms. However, Acknowledgement A is used to modify the send time slot for Packet C to more closely mirror the assigned time slot for receipt of Packet C. For example, Acknowledgement A may include an instruction to delay the next packet by 20 µs. As a result, Packet C is sent 20 µs earlier than 1.4 ms, as viewed by sensing device 602 and its clock 650. Upon receipt of the Packet C, the linking device 604 sends Acknowledgement C back to the sensing device 602 via the communication link 660 to confirm receipt of Packet C.

Receipt timing of the Packet C by the linking device 604 will be close enough to the assigned time slot C to identify the data packet as originating from the sensing device 602, and likely closer to the assigned time slot C due to the delay instruction, but some error will likely remain. Embedded within the Acknowledgement C is another instruction to modify timing of the next data packet to be sent outbound from the sensing device 602 to more closely match the time slot assigned to the sensing device 602. This instruction is intended to correct any difference between the assigned time slot C and the actual received time for Packet C at the linking device 604.

Another sample of the buffered data (Packet D) is pulled from the buffer 644 and sent out via the communication link 656 by default at 1.8 ms. However, Acknowledgement B is used to modify the send time slot for Packet D to more closely mirror the assigned time slot for receipt of Packet D. For example, Acknowledgement B may include an instruction to advance the next packet by 20 µs. As a result, Packet D is sent 20 µs later than 1.8 ms, as viewed by sensing device 628 and its clock 652. Upon receipt of the Packet D, the linking device 604 sends Acknowledgement D back to the sensing device 628 via the communication link 660 to confirm receipt of Packet D.

Receipt timing of the Packet D by the linking device 604 will be close enough to the assigned time slot D to identify the data packet as originating from the sensing device 628, and likely closer to the assigned time slot D due to the advance instruction, but some error will likely remain. Embedded within the Acknowledgement D is another instruction to modify timing of the next data packet to be sent outbound from the sensing device 628 to more closely match the time slot assigned to the sensing device 628. This instruction is intended to correct any difference between the assigned time slot D and the actual received time for Packet D at the linking device 604.

For simplicity in explanation, the specific example provided in FIG. 6 and described above only provides two sensing devices 602, 628 and four total data Packets A-D, two from each of the sensing devices 602, 628. In practice, this example may be extended to as many devices as desired within bandwidth limitations. Further, this example may be extended to a continuous sequence of numerous cascading data packets from the sensing devices 602, 628 (and perhaps additional sensing devices) to provide a continuous positive feedback loop to maintain timing of incoming data packets to the linking device 604 within the predetermined time slots. In some implementations, approximately three sequential cascading data packets from each of the sensing devices are sufficient to achieve a high level of accuracy in meeting the predetermined time slots. The provided close frequency and assigned time slots are also merely examples that may be increased or decreased in frequency depending on the demands of the linking device 604 and potential uses of the underlying information within the data packets.

Additionally, the data needed to transmit device orientation can be minimized to only a few bytes (e.g., less than 16 bytes or 8 bytes), which can be transmitted in under 1 msec, or even under 300 µs. The data packets (both containing the information from the sensing devices 602, 628 and the acknowledgement packets) may each include an identifier indicating intended destination of the packets. For example, the Packets A-D may include an identifier of the linking device 604 so that only the linking device 604 reads Packets A-D. Sensing devices other than the sending device may also receive the Packets A-D, but may ignore them based on the identifier. Similarly, the Acknowledgements A-D may include an identifier of a specific intended sensing device so that only that sensing device reads each outbound Acknowledgment. The linking device 604 and/or any of the other sensing devices may also receive the outbound acknowledgments but may ignore them based on the identifier.

While not in active use, the sensing devices 602, 628 can enter a low-power (sleep) mode with the microcontrollers 646, 648 on standby while the sensors 638, 640 fill up their respective data buffers 642, 644. When the assigned time slot for a sensing device approaches, the sensing device powers up its microcontroller in sufficient time to take a sample of its buffer and send that sample as an outgoing data packet intended for the linking device 604, as discussed in detail below. Following receipt of an acknowledgement from the linking device 604, the sensing device may again enter its low-power (sleep) mode until the next assigned time slot for the sensing device approaches. This process repeats iteratively and by maintaining each of the sensing devices in a low-power mode for a majority of the time, the battery life for each of the sensing devices is improved.

As discussed above, the sensing devices 602, 628 are synchronized with the linking device 604 such that the sensing devices 602, 628 are not sending data packets at the same time to reduce interference and enable the sensing devices 602, 628 to sleep between sends for improved battery life. Use of a low-power wireless connection and/or wire connection minimizes the power requirements of the sensing devices 602, 628, which allows them to be used to continuously sense while the system 600 is in use and still maintain long battery life. In a purely wired implementation, the sensing devices 602, 628 may omit dedicated battery power and draw power from a central battery located in the linking device 604.

While two sensing devices 602, 628 connected to one linking device 604 is illustrated in FIG. 6 as discussed in detail above, other implementations may incorporate any number of sensing devices (e.g., 1 to 32) connected to a singular linking device, with the only limiting factor being the bandwidth available to separate the inbound data packets from each of the sensing devices in time. In some implementations, signal frequency is used to further separate groupings of sensing devices. For example, if more sensing devices than available bandwidth are used with a singular linking device, a first grouping of the sensing devices may utilize a first frequency band and a second grouping of the sensing devices may utilize a second frequency band, thereby doubling the maximum possible sensing devices that may be connected to a linking device. For further example, two separate cascading communication systems may be used in close proximity (e.g., within the same room or building) by operating a first linking device and its associated sensing devices over a first frequency band and a second linking device and its associated sensing devices over a second frequency band. Still further, more than two frequency bands may be utilized to further expand the number of linking devices and associated sensing devices that may be used in close physical proximity to one another.

Figure 7:
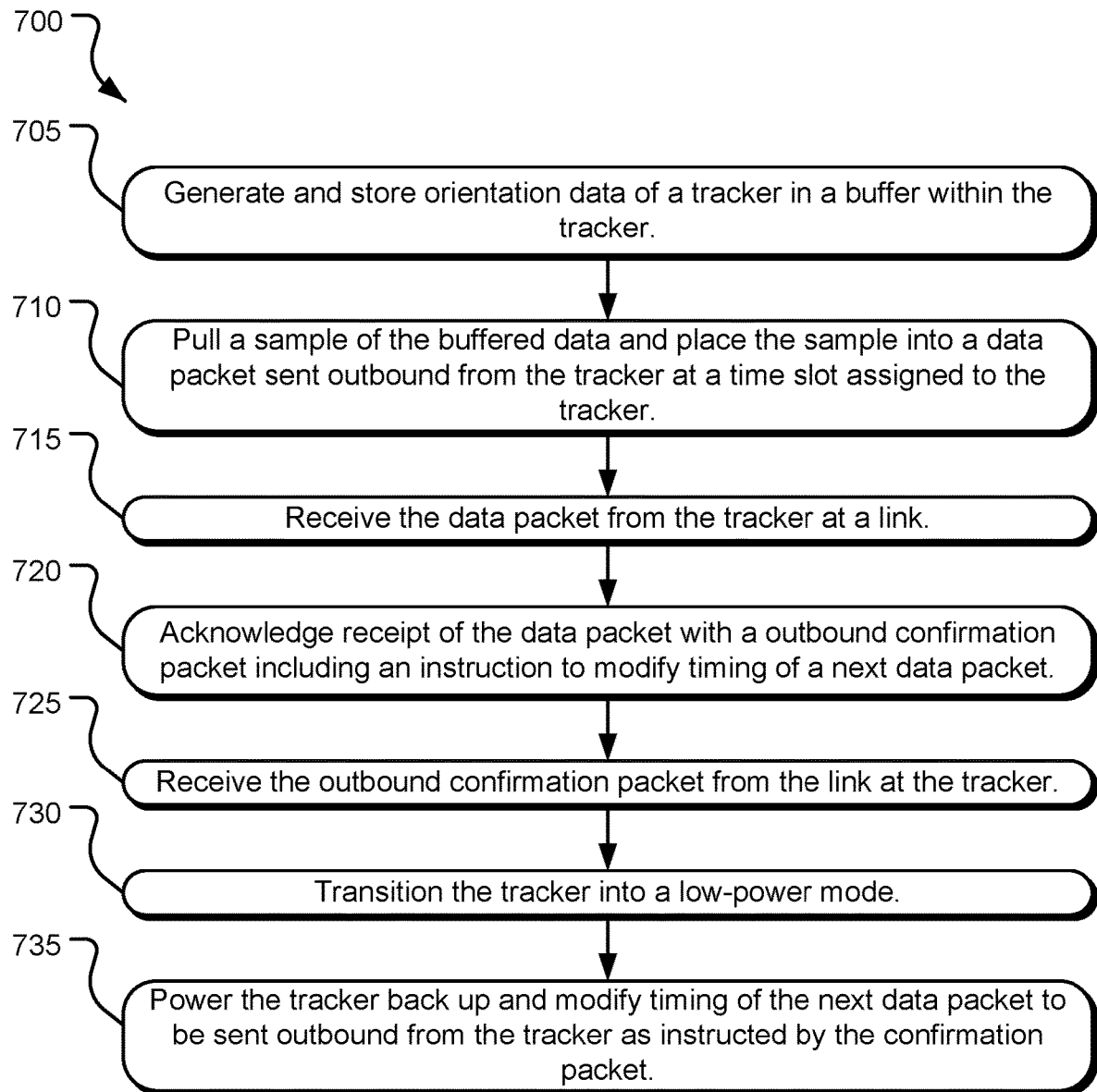
FIG. 7 illustrates example operations for using a full-body motion capture system according to the presently disclosed technology with cascading communications between a link and its connected trackers.

FIG. 7 illustrates example operations 700 for using a full-body motion capture system according to the presently disclosed technology with cascading communications between a link and its connected trackers. Other implementations may use the disclosed cascading communications operations for systems outside of full-body motion capture. A generating operation 705 generates and stores orientation data of a tracker in a buffer within the tracker. The tracker is a measurement device worn on a user's body to capture movements of the user's body. The tracker may be strategically placed and spaced apart from other trackers on the user's body to capture relative motions of different portions of the user's body. The tracker is equipped with a variety of sensors, collectively and in combination with a computing device referred to herein as an inertial measurement unit (IMU), to determine orientation and generate the orientation data.

A pulling operation 710 pulls a sample of the buffered data and places the sample into a data packet sent outbound from the tracker at a time slot assigned to the tracker as referenced against a tracker clock signal. The tracker includes a microcontroller with a communication link that performs the pulling operation 710. The tracker also includes a clock that defines the first tracker clock signal.

A receiving operation 715 receives the data packet from the tracker at a link. The link may be also placed on the user's body and also includes a communication link with receive and transmit capability. The link serves to receive and consolidate the orientation data received from connected trackers, such as the tracker discussed above, via the communication links.

An acknowledgment operation 720 acknowledges receipt of the data packet with an outbound confirmation packet including an instruction to modify timing of a next data packet to be sent outbound from the tracker to more closely match the time slot assigned to the tracker as referenced against a link clock signal. A second receiving operation 725 receives the outbound confirmation packet from the link at the tracker. A low-power operation 730 transitions the tracker into a low-power mode between the second receiving operation 725 and pulling a next sample of the buffered data for placement into a next data packet. When the time slot assigned to the tracker comes back around, a modifying operation 735 powers the tracker back up and modifies timing of the next data packet to be sent outbound from the tracker as instructed by the confirmation packet.

Operations 700 are substantially repeated for a second tracker that is assigned its own distinct time slot so that the data packets incoming to the link from the second tracker are distinguishable from the data packets incoming to the link from the tracker discussed in detail above. The specific example provided in FIG. 7 and described above only provides for one tracker and one data packet. In practice, this example may be extended to as many trackers as desired within bandwidth limitations. Further, this example may be extended to a continuous sequence of numerous cascading data packets from the trackers (and perhaps additional trackers) to provide a continuous positive feedback loop for each of the trackers to maintain timing of incoming data packets to the link within the predetermined time slots.

Figure 8A:
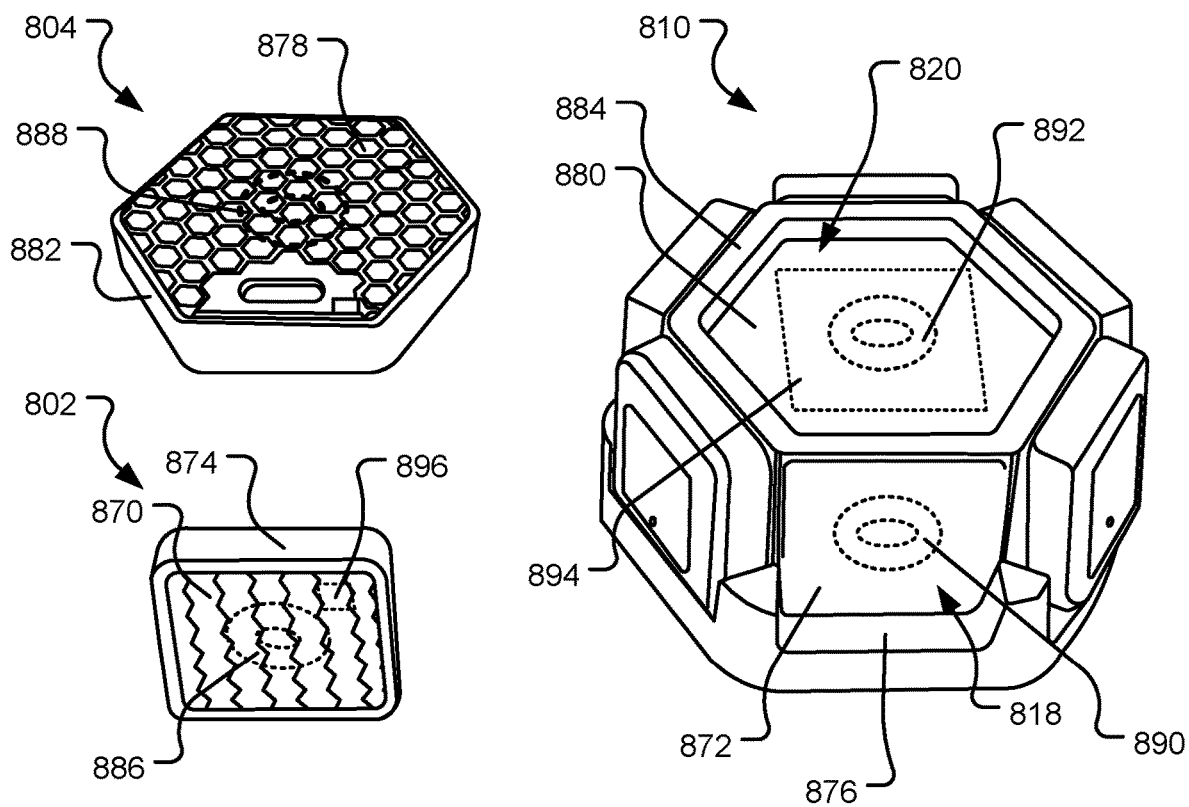
FIG. 8A illustrates an example charging hub with an associated tracker and link that each utilize low-power near-beam wireless inductive charging from the charging hub.

FIG. 8A illustrates an example charging hub 810 with an associated tracker (or sensing device) 802 and link 804 that each utilizes low-power near-beam wireless inductive charging from the charging hub 810. Broken lines illustrate structures and features that are shown for clarity but would not normally be visible. The charging hub 810 includes an array of six tracker docking stations (e.g., tracker docking station 818) that are configured to receive battery-powered sensing devices, such as trackers (e.g., the tracker 802) in a specific charging orientation. The tracker charging orientation may be described as backside 870 of the tracker 802 placed adjacent a frontside 872 of the tracker docking station 818, with the tracker 802 centered within the tracker docking station 818 and rotated such that one of its sides (e.g., side 874) aligns with a lower lip 876 of the tracker docking station 818 and the tracker 802 seats within a saddle in the charging hub 810 formed by the tracker docking station 818. The charging hub 810 further includes a link docking station 820 that is configured to receive the link 804, also in a specific charging orientation. The link charging orientation may be described as backside 878 of the link 804 placed adjacent a topside 880 of the link docking station 820, with the link 804 centered within the link docking station 820 and rotated such that its sides (e.g., side 882) align with lips (e.g., lip 884) of the link docking station 820 and the link 804 seats within a recess in the charging hub 810 formed by the link docking station 820.

The link 804 and trackers slip fit within the link and tracker docking stations (with or without rubber pieces), respectively, to removably secure the link 804 and trackers in place on the charging hub 810 in the desired orientation. In other implementations, the trackers include receivers (not shown) on each side that removably receive matching clips (also not shown) on the charging hub 810 to secure the trackers in place on the charging hub 810 in the desired orientation. Still further implementations may include magnets within the link and tracker docking stations that are paired with magnets within the link and trackers themselves, respectively, to removably secure the link 804 and trackers in place on the charging hub 810 in the desired orientation.

The charging hub 810 utilizes low-power near-beam wireless inductive charging to charge the trackers and the link 804 when properly seated within their respective docking stations on the charging hub 810. Each of the trackers includes a tracker inductive coil oriented inside of and adjacent to a planar exterior surface of the tracker (e.g., tracker inductive coil 886 inside a planar exterior surface, such as backside 870 of tracker 802). Each of the tracker docking stations includes a matching station inductive coil oriented inside of and adjacent to a planar exterior surface of the docking station (e.g., station inductive coil 890 inside a planar exterior surface, such as frontside 872 of tracker docking station 818). Similarly, the link 804 includes a link inductive coil 888 oriented inside of and adjacent to a planar exterior surface (e.g., backside 878) of the link 804. A matching station inductive coil 892 is oriented inside of and adjacent to a planar exterior surface (e.g., topside 880) of the link docking station 820.

The low-power near-beam wireless inductive charging can be achieved with fewer components than the prior art. Typical wireless charging systems include specialized circuits and have a high component count, which limits their use to larger devices. Additionally, prior art solutions include a wireless power channel and a separate wireless communication channel that increases cost and takes up PCB space. Although a wireless communication channel is often required for safety when transferring multiple watts of power through a single coil, the presently disclosed design consumes no more than 250 mW of power per coil. This power is low enough to allow for most materials to dissipate generated thermal energy at ambient temperature.

Additionally, the charging hub 810 forms a negative feedback loop in which foreign objects placed on the charging hub 810 will alter the impedance of an LC circuit such that less power is transferred automatically. For example, when no devices are charging, each coil consumes 20 mW of power due to the change in impedance resulting from the reduced load. The short range of less than 3 or 5 mm also ensures that unintentional radiation does not get absorbed by stray objects. The transmitter operates through a fixed clock source oscillating at a couple hundred KHz that is tuned to minimize the coil impedance. The clock is sent through a buffer that isolates the impedance of the various devices charging so that each operates independently of the others. A transistor takes the buffered signal and quickly switches on and off the high-side LC circuit such that a magnetic field is induced within the coil (L). Whenever a properly impedance-matched coil is brought within 4 or 5 mm of the transmitter coil, the impedance of the charging hub 810 changes to a value that maximizes the magnetic field generation and thus increases wireless power transfer efficiency.

Charging multiple devices utilizes a single clock source. The number of charging devices is increased by increasing the number of buffers, transistors, and LC circuits to match the number of devices. The theoretical limit is based on the amount of power that the charging hub 810 can provide. There are two methods of isolation that can make this method work in multidevice configurations where other methods may fail. First, the clock signal is isolated electrically with a buffer so that the multiple devices do not influence each other. Second, the magnetic field is isolated physically using the specific orientation of the charger coil locations and the ferrite sheets that redirect the magnetic field. If the charger were a simple grid of devices or if there were no ferrite sheets behind each coil, the transmitter coil magnetic fields would interact with each other, and power would flow from the transmitter coil to the neighboring transmitter coil instead of from the transmitter coil to the receiver coil as intended, which negatively affects charging. This occurs because the induced magnetic field's shape is a closed curve that stretches from one pole to the next. If the coils are next to each other on the same plane, then the magnetic field will travel between adjacent coils as that is the shortest path of the poles. Likewise, if the coils do not have a ferrite sheet but the shape of the charger as disclosed is maintained, the field lines will connect inside the charger itself as that is the shortest path between poles. To have adequate separation of the magnetic field, the coils are physically separated and shielded from each other, which is achieved by ferrite sheets. Angling the coils with respect to each other enables closer coils than distancing linearly on the same plane.

The link 804/trackers receiver circuitry includes a full-bridge rectifier to convert supplied AC voltage to DC voltage and a constant current regulator (CCR). The full-bridge rectifier can be made with transistors if higher efficiency than diodes is required. The circuit can monitor the battery voltage and turn off the CCR whenever the link 804/tracker battery is nearing capacity. This changes the receiver LC circuit impedance by altering the load, which reduces power to the link 804/tracker being charged, resulting in minimal heating and power loss. The controllable CCR enables state-of-the-art charging techniques such as pulsed current charging, which has been shown to maximize the battery life over conventional charging methods such as constant current and constant-voltage (CC-CV) charging. The circuit may produce an overall efficiency of over 70%, even when charging multiple devices.

Figure 8B:
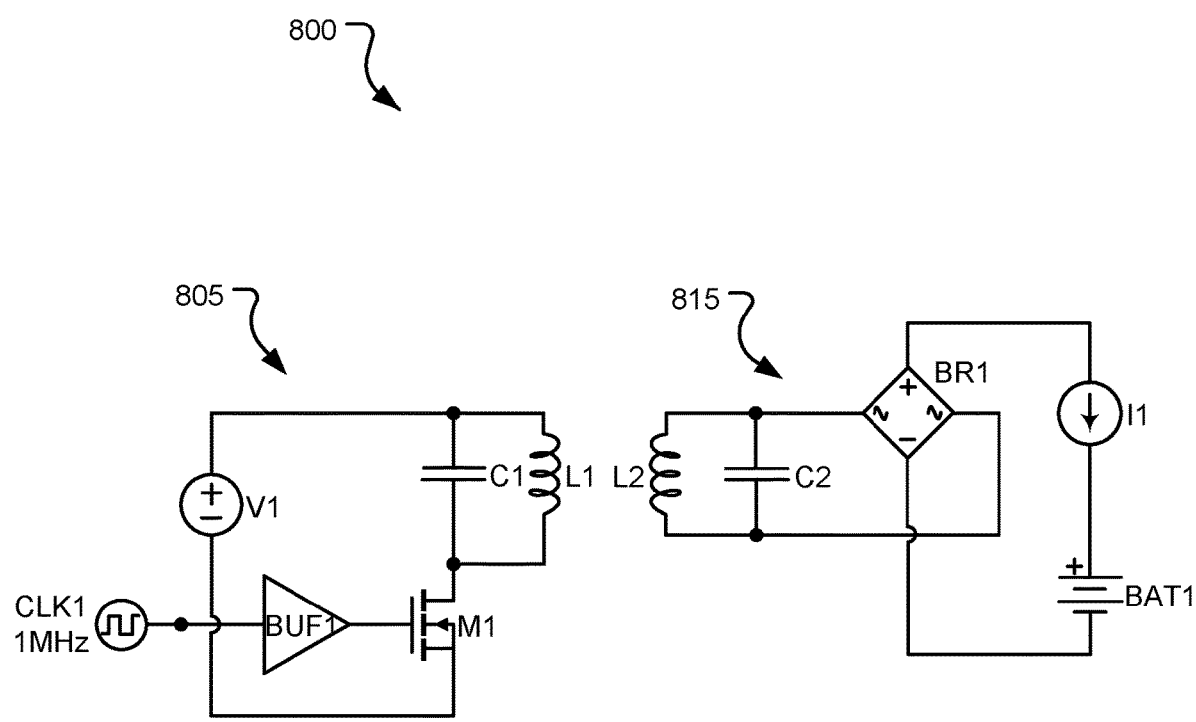
FIG. 8B illustrates an example low-power near-beam wireless inductive charging circuit.

FIG. 8B illustrates an example low-power near-beam wireless inductive charging circuit 800. In a typical simple inductive charging circuit according to the prior art, Series LC circuits are used because they can output more power and are more efficient than their equivalent Parallel LC circuits. However, the increased power comes at the cost of a smaller operating range when the load or impedance is altered, which is why chargers of this type use a feedback loop to tune the frequency and amplitude to find the optimal power transfer point.

In a typical flexible inductive charging circuit according to the prior art, issues with the simple series LC circuit are resolved by adding a feedback loop to find optimal charging parameters under varying loads. The custom transmitter and custom receiver are responsible for both power transfer and communication using the same coil. Typically, the communication and power transfer occur at different frequencies so that the system can differentiate between them. These designs can alter the frequency, amplitude, and load of the circuit to find the optimal charging point. The power at the receiver is measured and sent back to the transmitter. The transmitter then calculates the efficiency and adjusts the frequency and amplitude to give the most efficient charging. This system can compensate for various coil materials, coil shapes, coil spacing, and varying loads. However, this system is unable to work in multidevice configurations because of the need to find the optimal power transfer point per device. A multidevice configuration may require multiple custom TX ICs so that each one can monitor each device independently.

The low-power near-beam wireless inductive charging circuit 800 uses a parallel LC circuit, which has a lower peak power transfer rating but a higher resilience under changing loads and impedances than prior art solutions. This means that even if the inductor values, capacitor values, or load is slightly different, the power transfer is not affected and is still near peak performance. In other words, using a parallel LC circuit eliminates the need for the secondary communication channel that optimizes the narrow optimal point present in a series LC circuit.

Near beam inductive charging keeps the frequency and amplitude of the clock source the same. Magnetically coupled parallel LC tank circuits 805, 815 form a $4^{th}$-order expression with multiple optimal points depending on the frequency and the coupling factor (k-factor) of the two coils (L1, L2). The k-factor is the efficiency of the two coils (L1, L2) and will be 1.0 when the power transfer is lossless. In prior art solutions, the power is calculated at the receiver and then sent back to the charger. The charger can then calculate the power loss and adjust accordingly. This provides maximum power transfer even across multiple charging frequencies. Since the circuit 800 lacks a secondary communication channel, there is no way to communicate the power at the receiver or calculate efficiency on the fly. Instead, optimal power transfer is achieved by impedance matching the receiver LC circuit 815 with the transmitter LC circuit 805. When circuits 805, 815 are impedance matched, the resistive losses are minimized for that frequency. This does not necessarily mean the power transfer is maximized at that frequency, but because a Parallel LC Circuit is used, the resulting power transfer will be near peak efficiency. Additionally, by using a Parallel LC Circuit, the point of minimal loss is large even under changing loads which means varying receiver coil sizes and receiver LC circuits can be used on the same transmitter. Assuming a known coil inductance and a known frequency, the capacitors can be chosen to find this point of minimal resistive loss by the following equations:

$$C\_TX=1/(L\_TX*(1.29*2*PI*F)^2); \text{ and}$$

$$C\_RX=1/(L\_RX*(2*PI*F)^2), \text{ wherein}$$

C=Capacitor of Capacitor in LC Circuit in Farads;
L=Inductance of Coil in LC Circuit in Henries; and
F=Clock frequency.

A value 1.29 is used on the transmitter side to account for transistor zero-voltage-switching (ZVS), which is the point at which the transistor switching losses will be minimized. The coil inductance and shape can also change while maintaining this equation as it only gives the values that minimize resistive losses. Power transfer losses are governed by the k-factor which mostly concerns the coil coupling. Frequency can be set to minimize component cost. A lower frequency means a larger capacitor which equates to larger resistive losses. Generally, lower frequencies increase the power transfer rate but result in larger losses while higher frequencies decrease the power transfer rate but result in higher efficiency. Approximately 200 kilohertz (KHz) is a good range for achieving a balance of efficiency and adequate power transfer. An additional advantage of tuning based on impedance matching is that the frequency will stay the same, but the induced magnetic field will change depending on the load. In this way, the circuit 800 automatically minimizes losses when loaded and when unloaded. Although the Near Beam Charging circuit 800 does not maximize total power efficiency, it does minimize power loss, which in low-power applications may be sufficient.

When the trackers are placed in the specific charging orientation within a tracker docking station, a tracker inductive coil faces a station inductive coil (e.g., tracker inductive coil 886 of tracker 802 faces station inductive coil 890 within the docking station 818) thereby making a matched pair of inductive coils. Similarly, when the link 804 is placed in the specific charging orientation within the link docking station 820, the link inductive coil 888 faces the station inductive coil 892 thereby making a matched pair of inductive coils. In the charging orientation, a matched pair of inductive coils are coplanar and centered over one another, and they are in close proximity (e.g., 3 mm to 5 mm or less than 6 mm) apart from one another.

The matched pairs of tracker inductive coils are generally capable of transferring approximately 30 milliamps of power at 5 volts, at an approximately 70% conversion rate. Power transfer can generally be increased by increasing the diameter of the coils without significant loss in efficiency. For example, the link 804 coil may be capable of transferring approximately 85 mA of power at 5V by increasing the coil diameter from 12 mm to 20 mm. The power transfer capability is directly related to the area of the coil. These numbers represent maximum power transfer and fall within a standard 500 mA 5 V USB port. Additionally, charging power can be reduced on the receiver side by simply lowering the duty cycle at which the CCR is active. This is useful in situations where one may want to equalize the charge on the set of link 804/trackers by adjusting the rate of charge per device or when the charger is operating from a power-constrained supply.

In various implementations, the tracker inductive coils may utilize constant current, pulsed current, constant voltage, pulsed voltage, or some combination thereof, that may or may not be matched to the impedance and other characteristics of the batteries to be charged (e.g., battery 896). In some implementations, one of the matched pairs of inductive coils (e.g., inductive coils 888, 892) is larger than other matched pairs of inductive coils (e.g., inductive coils 886, 890). The enlarged coils may allow for a faster rate of power transfer from the charging hub 810 to the link 804 as compared to the trackers. This may be due to the battery capacity and power demands of the link 804 exceeding that of the trackers. For example, the inductive coils 888, 892 may be 20% larger in area than the inductive coils 886, 890 and enable 20% greater power transfer than the inductive coils 886, 890. Mismatched coil sizes can also be used in situations where perfect coil alignment cannot be guaranteed as the mismatch will transfer more power over a larger area.

The station inductive coils (e.g., inductive coils 890, 892) may be kept in an always-on state so long as the charging hub 810 is powered (e.g., via its own battery or an external power supply). This avoids additional complexity and cost of providing a separate channel to control on/off states of the station inductive coils, as provided by much of the prior art. Due to a relatively small power transfer rate and close proximity of match pairs of inductive coils, such as that noted above, powering the station inductive coils even when the matching tracker/link 804 inductive coils are off or not present, is not hazardous (e.g., the low power does not create a shock risk or fire hazard). The tracker/link 804 inductive coils (e.g., inductive coils 886, 888) are switched off by their respective tracker/link 804 when a respective battery (e.g., battery 896) is indicated as fully charged so that the batteries in the trackers and link 804 are not overcharged. In other implementations, the station inductive coils are switched on/off as well over separate channels.

Each of the inductive coils within the charging hub 810, the trackers, and the link 804 are shielded on a backside of the inductive coil facing an interior of the charging hub 810, the trackers, and the link 804, respectively. The shields (e.g., shield 894) are generally planar and at least cover a footprint of the inductive coils, and perhaps more, as shown in FIG. 8A. The shields may take the form of metallic or ferrite sheets that are specifically intended to block a majority of the magnetic field emanating from the inductive coils from penetrating the shields into the charging hub 810, the trackers, and the link 804. The shields also serve to amplify the magnetic field emanating from a front side of the inductive coils and focus an otherwise hemispherical spherical magnetic field toward a center of the inductive coils and away from the charging hub 810, the trackers, and the link 804. The docking stations may also be shielded from one another to prevent unwanted magnetic interference from adjacent docking stations and ensure that the docking stations provide sufficient and equal charging rates to the trackers and the link 804. In other implementations, the charging hub 810 at its docking stations utilizes metal contacts that pair with metal contacts on the trackers and the link 804 for a traditional charging scheme.

As illustrated, the docking stations on the charging hub 810 are arranged in a multi-faceted arrangement where the docking stations are not oriented in a singular plane like many prior art wireless charging pucks and pads. This orientation physically separates a charging coil's magnetic field from adjacent charging coils' magnetic fields to enable multidevice charging in a compact space. While the charging hub 810 is depicted with six docking stations for trackers and a singular docking station 820 for the link 804, as few as two docking stations and as many docking stations for trackers and/or links as desired may be used in other implementations. Further, while the charging hub 810 has a specific number of charging stations, not all of the charging stations may be in use at one time to charge connected trackers and/or links. Still further, the charging hub 810 may also double as a storage caddy for the trackers and/or the link 804 when not in use. Further still, the charging hub 810 may be physically connected to a power source when in use, or the charging hub 810 may have its own battery power supply that is rechargeable so that the charging hub 810 may charge the trackers and/or the link 804 even when not physically connected to a power source, if sufficient charging hub 810 battery power is available.

The disclosed low-power near-beam wireless inductive charging is advantageous over prior art solutions that use electrical contacts in that it is waterproof, requires only one cable for powering (or charging the charging hub 810, if it is battery powered), no separate power bank is required, no USB or other connections are required on the trackers and/or the link 804, and the charging hub 810/trackers/the link 804 are easy to transport and use.

The disclosed low-power near-beam wireless inductive charging is advantageous over prior art wireless inductive solutions in that the prior art solutions are intended to transfer high power and provide more flexibility in aligning the matched pair of inductive coils. The present technology is lower power, in part enabled by the specific charging orientations disclosed herein, that allow for even smaller coils. The lower power and small coils as compared to the prior art further enable the station inductive coils to be kept in an always-on state so long as the charging hub 810 is powered. This avoids an additional complexity and cost of providing a separate channel to control on/off states of the station inductive coils, as provided by much of the prior art.

Figure 9:
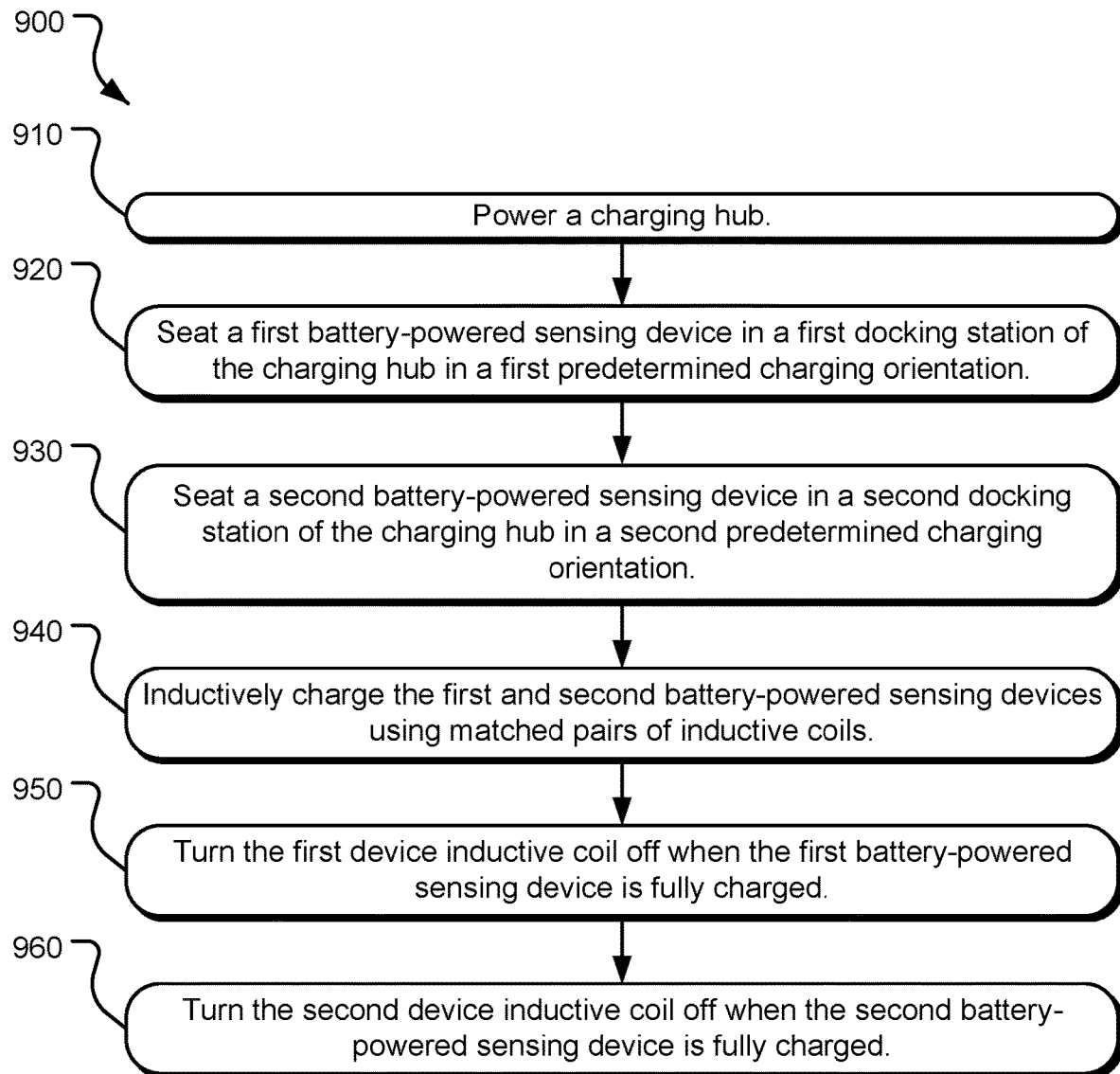
FIG. 9 illustrates example operations for using a low-power near-beam wireless charging hub.

FIG. 9 illustrates example operations 900 for using a low-power near-beam wireless charging hub. While the low-power near-beam wireless charging hub is explicitly described to charge an array of trackers and a link for a full-body motion capture system, the low-power near-beam wireless charging hub may be used to charge a variety of battery-powered sensing devices. A powering operation 910 powers a charging hub via an external power supply or an internal battery. The charging hub includes docking stations and station inductive coils oriented inside of and adjacent planar exterior surfaces of the docking station. The docking stations are in a multi-faceted arrangement about an exterior of the charging hub and are shielded from one another.

A first seating operation 920 seats a first battery-powered sensing device (e.g., a tracker) in a first docking station of the charging hub in a first predetermined charging orientation. The first battery-powered sensing device includes a first device inductive coil oriented inside of and adjacent to a planar exterior surface of the first battery-powered sensing device. One of the station inductive coils faces the first device inductive coil in the first predetermined charging orientation.

A second seating operation 930 seats a second battery-powered sensing device (e.g., a link) in a second docking station of the charging hub in a second predetermined charging orientation. The second battery-powered sensing device includes a second device inductive coil oriented inside of and adjacent to a planar exterior surface of the second battery-powered sensing device. Another of the station inductive coils faces the second device inductive coil in the second predetermined charging orientation.

A charging operation 940 inductively charges the first and second battery-powered sensing devices using matched pairs of inductive coils. A first matched pair is the first device inductive coil and one of the station inductive coils. A second matched pair is the second device inductive coil and another of the station inductive coils.

In some implementations, the station inductive coils are always on when the charging hub is powered, and on/off charging control is handled at the battery-powered sensing device. A first turning-off operation 950 turns the first device inductive coil off when the first battery-powered sensing device is fully charged. A second turning-off operation 960 turns the second device's inductive coil off when the second battery-powered sensing device is fully charged.

While use of two battery-powered sensing devices within two docking stations is described specifically above, as many battery-powered sensing devices and corresponding docking stations within the charging hub as desired may be used as described above in other implementations. Further, not all of the charging stations may be in use at one time to charge connected battery-powered sensing devices, such as trackers and/or links for a full-body motion capture system.

Figure 10:
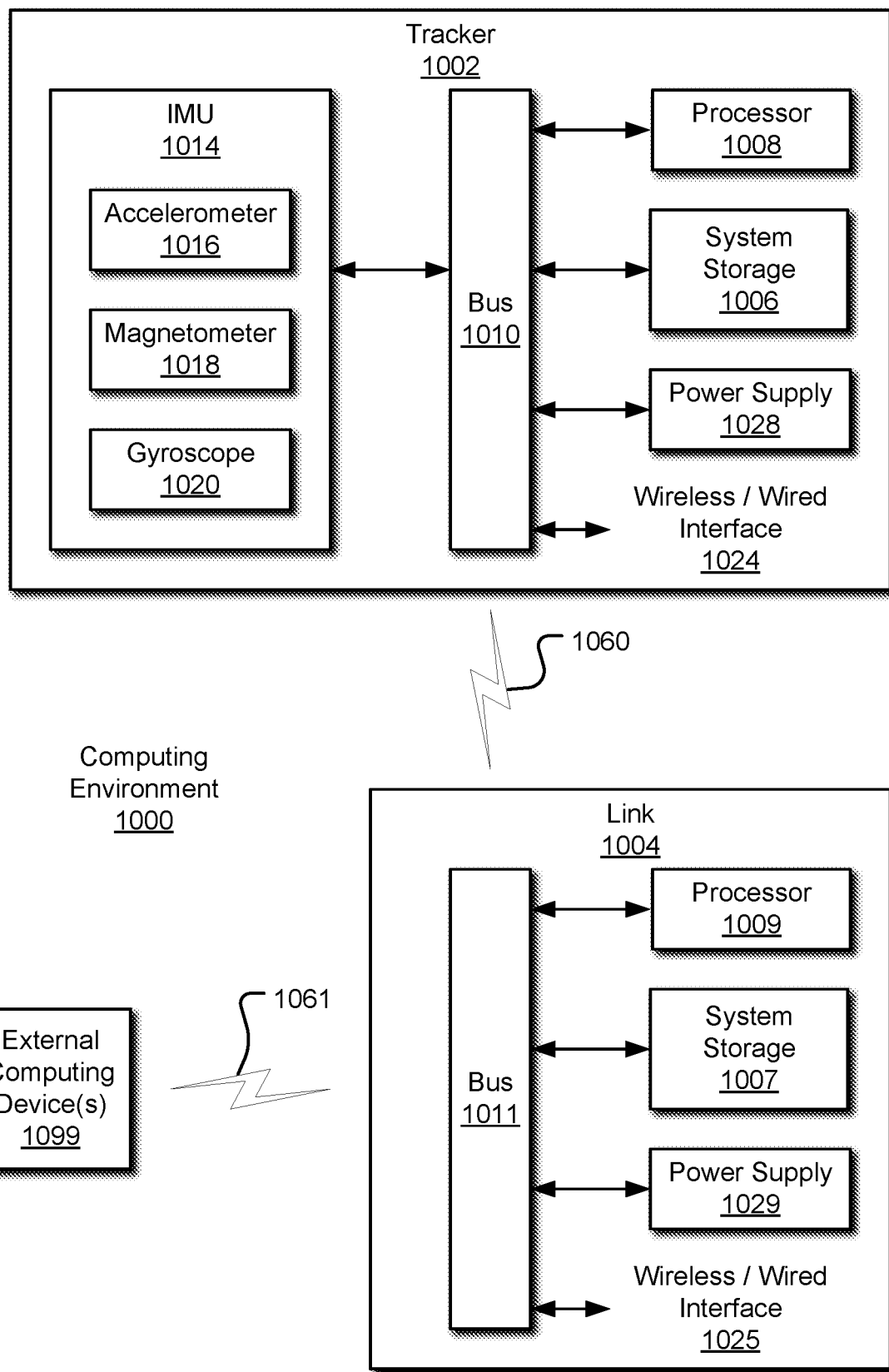
FIG. 10 illustrates an example system diagram for a computing environment suitable for executing a full-body motion capture system according to the presently disclosed technology.

FIG. 10 illustrates an example system diagram for a computing environment 1000 suitable for executing a full-body motion capture system according to the presently disclosed technology. Tracker (or sensing device) 1002 includes an IMU 1014 including an accelerometer 1016, a magnetometer 1018, and a gyroscope 1020 that in combination provide orientation data for the tracker 1002. The orientation data flows through a bus 1010 (e.g., a printed circuit board) to a microcontroller that includes at least a processor 1008, system storage 1006, a power supply 1028, and a wired/wireless interface 1024. While only one tracker 1002 is illustrated in FIG. 10 and described above, the full-body motion capture system as described in detail elsewhere herein may include two or more trackers, each of which may be configured and described above and shown in FIG. 10.

Link (or linking device) 1004 receives and consolidates orientation data received from a set of trackers, such as tracker 1002, via a wired or wireless communication link 1060 between the wired/wireless interface 1024 of the tracker 1002 and a wired/wireless interface 1025 of the link 1004. In various implementations, the link 1004 receives data from the tracker 1002 and other connected trackers. With or without consolidating and/or further processing the received data, the link 1004 transmits the data over another wired or wireless communication link 1061 with external computing device(s) 1099 (e.g., smartphones, tablet computers, laptop computers, desktop computers, servers, and virtual machines).

As such, the wired/wireless interface 1025 of the link 1004 may include three radios, for example. A first radio establishes the communication link 1060 with the tracker 1002. A second radio utilizes Bluetooth to establish the communication link 1061 with the external computing device(s) 1099. A third radio utilizes WiFi to establish the communication link 1061 with the external computing device(s) 1099. A greater or fewer number of radios, including different radios than that listed, and including an option for radios that are capable of using multiple communication standards, are also contemplated herein.

In general, both the tracker 1002 and the link 1004, buses 1010, 1011 interconnect major subsystems such as processors 1008, 1009, system storages 1006, 1007 (such as random-access memory (RAM) and read-only memory (ROM)), and power supplies 1028, 1029. Wired/wireless interfaces 1024, 1025 are used to establish the communication links 1060, 1061, which ultimately allow the link 1004, tracker 1002, and other connected trackers to transmit tracker orientation and/or position data to a data storage network and/or a local or wide area network (such as the Internet), via the external computing device(s) 1099, using any network interface system known to those skilled in the art.

Many other devices or subsystems (e.g., servers, personal computers, tablet computers, smartphones, mobile devices, etc.) may be connected in a similar manner to that depicted in FIG. 10. Also, it is not necessary for all of the components depicted in FIG. 10 to be present to practice the presently disclosed technology. Furthermore, devices and components thereof may be interconnected in different ways from that shown in FIG. 10. Code (e.g., computer software, including mobile applications (apps)) to implement the presently disclosed technology may be operably disposed in the system storage 1006, 1007 as firmware or software.

The tracker 1002 and/or link 1004 may include a variety of tangible computer-readable storage media (e.g., the system storage 1006, 1007) and intangible computer-readable communication signals. Tangible computer-readable storage can be embodied by any available media that can be accessed by the tracker 1002 and/or link 1004 and includes both volatile and non-volatile storage media, as well as removable and non-removable storage media implemented in any method or technology for storage of information such as computer-readable instructions, data structures, program modules, and/or other data. Tangible computer-readable storage media includes but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the tracker 1002 and/or link 1004.

Intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, the logical operations may be performed in any order, adding or omitting operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A cascading communication system comprising:
  a first sensing device including:
    one or more sensors to generate and store data in a first buffer;
    a first microcontroller to pull a sample of the buffered data of the first buffer and place the sample of the buffered data of the first buffer into a first data packet sent outbound from the first sensing device at a time slot assigned to the first sensing device as referenced against a first sensing device clock signal;
  a second sensing device including:
    one or more sensors to generate and store data in a second buffer;
    a second microcontroller to pull a sample of the buffered data of the second buffer and place the sample of the buffered data of the second buffer into a second data packet sent outbound from the second sensing device at a time slot assigned to the second sensing device as referenced against a second sensing device clock signal; and
  a linking device connected to the first and second sensing devices, the linking device to:
    receive the first data packet from the first sensing device;

acknowledge receipt of the first data packet with a first outbound confirmation packet including an instruction to modify timing of a next data packet to be sent outbound from the first sensing device to more closely match the time slot assigned to the first sensing device as referenced against a linking device clock signal;

receive the second data packet from the second sensing device; and acknowledge receipt of the second data packet with a second outbound confirmation packet including an instruction to modify timing of a next data packet to be sent outbound from the second sensing device to more closely match the time slot assigned to the second sensing device as referenced against the linking device clock signal.

2. The cascading communication system of claim 1, wherein each of the first and second data packets includes an identifier indicating the linking device as an intended destination of the first and second data packets.

3. The cascading communication system of claim 1, wherein the first microcontroller is to:

receive the first outbound confirmation packet from the linking device; and modify timing of the next data packet to be sent outbound from the first sensing device as instructed by the first outbound confirmation packet, and wherein the second microcontroller is to:

receive the second outbound confirmation packet from the linking device; and modify timing of the next data packet to be sent outbound from the second sensing device as instructed by the second outbound confirmation packet.

4. The cascading communication system of claim 1, wherein each of the first and second sensing devices enters a low-power mode between receiving an outbound confirmation packet from the linking device and pulling a next sample of buffered data for placement into a next data packet.

5. The cascading communication system of claim 1, wherein each of the first and second data packets are less than 16 bytes.

6. The cascading communication system of claim 1, wherein each of the first and second data packets are encrypted using a symmetric key algorithm using stream ciphers.

7. A method of cascading tracker communications within a body motion capture system, the method comprising:

generating and storing orientation data of a first tracker in a first buffer within the first tracker;

pulling a sample of the buffered orientation data of the first buffer and placing the sample of the buffered orientation data of the first buffer into a first data packet sent outbound from the first tracker at a time slot assigned to the first tracker as referenced against a first tracker clock signal;

receiving the first data packet from the first tracker at a link;

acknowledging receipt of the first data packet with a first outbound confirmation packet including an instruction to modify timing of a next data packet to be sent outbound from the first tracker to more closely match the time slot assigned to the first tracker as referenced against a link clock signal;

generating and storing orientation data of a second tracker in a second buffer within the second tracker;

pulling a sample of the buffered orientation data of the second buffer and placing the sample of the buffered orientation data of the second buffer into a second data packet sent outbound from the second tracker at a time slot assigned to the second tracker as referenced against a second tracker clock signal;

receiving the second data packet from the second tracker at the link; and acknowledging receipt of the second data packet with a second outbound confirmation packet including an instruction to modify timing of a next data packet to be sent outbound from the second tracker to more closely match the time slot assigned to the second tracker as referenced against the link clock signal.

8. The method of claim 7, wherein each of the first and second data packets includes an identifier indicating the link as an intended destination of the first and second data packets.

9. The method of claim 7, further comprising:

receiving the first outbound confirmation packet from the link;

modifying timing of the next data packet to be sent outbound from the first tracker as instructed by the first outbound confirmation packet;

receiving the second outbound confirmation packet from the link; and modify timing of the next data packet to be sent outbound from the second tracker as instructed by the second outbound confirmation packet.

10. The method of claim 7, further comprising:

entering a low-power mode at each of the first and second trackers between receiving an outbound confirmation packet from the link and pulling a next sample of buffered data for placement into a next data packet.

11. The method of claim 7, further comprising:

consolidating received data packets into a singular body motion capture signal;

sending the singular body motion capture signal outbound from the link;

receiving the singular body motion capture signal from the link at a computing device; and interpolating the singular body motion capture signal to create a digital representation of user's body movements.

12. The method of claim 7, wherein each of the first and second data packets are encrypted using a symmetric key algorithm using stream ciphers.

13. A body motion capture system comprising:

a first tracker to be positioned on a first portion of a user's body, the first tracker including:

one or more sensors to generate and store orientation data of the first tracker in a first buffer;

a first microcontroller to pull a sample of the buffered orientation data of the first buffer and place the sample of the buffered orientation data of the first buffer into a first data packet sent outbound from the first tracker at a time slot assigned to the first tracker as referenced against a first tracker clock signal;

a second tracker to be positioned on a second portion of the user's body, the second tracker including:

one or more sensors to generate and store orientation data of the second tracker in a second buffer;

a second microcontroller to pull a sample of the buffered orientation data of the second buffer and place the sample of the buffered orientation data of the second buffer into a second data packet sent outbound from the second tracker at a time slot assigned to the second tracker as referenced against a second tracker clock signal; and a link connected to the first and second trackers, the link to:
  receive the first data packet from the first tracker;
  acknowledge receipt of the first data packet with a first outbound confirmation packet including an instruction to modify timing of a next data packet to be sent outbound from the first tracker to more closely match the time slot assigned to the first tracker as referenced against a link clock signal;
  receive the second data packet from the second tracker; and
  acknowledge receipt of the second data packet with a second outbound confirmation packet including an instruction to modify timing of a next data packet to be sent outbound from the second tracker to more closely match the time slot assigned to the second tracker as referenced against the link clock signal.

14. The body motion capture system of claim 13, wherein each of the first and second data packets includes an identifier indicating the link as an intended destination of the first and second data packets.

15. The body motion capture system of claim 13, wherein the first microcontroller is to:
  receive the first outbound confirmation packet from the link; and
  modify timing of the next data packet to be sent outbound from the first tracker as instructed by the first outbound confirmation packet, and wherein the second microcontroller is to:
  receive the second outbound confirmation packet from the link; and
  modify timing of the next data packet to be sent outbound from the second tracker as instructed by the second outbound confirmation packet.

16. The body motion capture system of claim 13, wherein each of the first and second trackers enters a low-power mode between receiving an outbound confirmation packet from the link and pulling a next sample of buffered data for placement into a next data packet.

17. The body motion capture system of claim 13, further comprising:
  a third combined tracker to be positioned on a third portion of the user's body, the third combined tracker including:
    two or more individual trackers, each of the two or more individual trackers including:
      one or more sensors to generate and store orientation data of the third combined tracker in a third buffer;
      a third microcontroller to pull a sample of the buffered orientation data of the third buffer and place the sample of the buffered orientation data of the third buffer into a third data packet sent outbound from the third combined tracker at a time slot assigned to the third tracker as referenced against a third combined tracker clock signal.

18. The body motion capture system of claim 17, wherein the third combined tracker is a glove.

19. The body motion capture system of claim 13, wherein the link is further to consolidate received data packets into a singular body motion capture signal, the body motion capture system further comprising:
  a computing device to receive the singular body motion capture signal from the link and interpolate the singular body motion capture signal to create digital representation of user's body movements.

20. The body motion capture system of claim 13, wherein each of the first and second data packets are encrypted using a symmetric key algorithm using stream ciphers.

* * * * *